(12) United States Patent
Foreman

(10) Patent No.: US 11,733,351 B2
(45) Date of Patent: Aug. 22, 2023

(54) RADAR DETECTION OF MIGRATING TARGETS USING AN INTERFERENCE CORRELATION MATRIX

(71) Applicant: Terry Lee Foreman, Colonial Beach, VA (US)

(72) Inventor: Terry Lee Foreman, Colonial Beach, VA (US)

(73) Assignee: United States of Americ, as represented by the Secretary of the Navy, Arlington, VA (US)

(*) Notice: Subject to any disclaimer, the term of this patent is extended or adjusted under 35 U.S.C. 154(b) by 349 days.

(21) Appl. No.: 16/916,525

(22) Filed: Jun. 30, 2020

(65) Prior Publication Data

US 2022/0091232 A1    Mar. 24, 2022

(51) Int. Cl.
*G01S 7/41*        (2006.01)
*G01S 13/53*       (2006.01)
*G01S 13/534*      (2006.01)
*G01S 13/00*       (2006.01)

(52) U.S. Cl.
CPC ............ *G01S 7/414* (2013.01); *G01S 13/534* (2013.01); *G01S 13/003* (2013.01)

(58) Field of Classification Search
CPC ...... G01S 7/414; G01S 13/534; G01S 13/003; G01S 7/2923
See application file for complete search history.

(56) References Cited

U.S. PATENT DOCUMENTS

| | | | |
|---|---|---|---|
| 6,252,540 B1* | 6/2001 | Hale | G01S 13/524 342/162 |
| 9,857,455 B2* | 1/2018 | Foreman | G01S 7/414 |
| 2006/0273951 A1* | 12/2006 | Adams | G01S 7/4008 342/194 |
| 2012/0320363 A1* | 12/2012 | Goodman | G01C 3/08 356/4.01 |
| 2021/0223385 A1* | 7/2021 | Breton | G01S 13/88 |
| 2022/0091249 A1* | 3/2022 | Raghavan | G01S 7/023 |

* cited by examiner

*Primary Examiner* — Donald H B Braswell
(74) *Attorney, Agent, or Firm* — Gerhard W. Thielman

(57) ABSTRACT

A computer-implemented method is provided for detecting a target amidst clutter by a radar system able to transmit an electromagnetic signal, receive first and second echoes respectively from the target and the clutter, and process the echoes. The method includes determining signal convolution matrix for the target and a target return phase, clutter amplitude by spatial correlation matrix of clutter, clutter correlation matrix, receive noise power; querying whether the clutter moves as a motion condition if satisfied and as a stationary condition otherwise; calculating signal convolution matrix and target return phase from the signal convolution matrix and the target return phase for target motion; querying whether the target has range migration as a migration condition if satisfied and as a non-migration condition otherwise; and forming a target detector for the radar. The motion condition further includes calculating signal convolution matrix from clutter motion, clutter range migration matrix from the clutter motion, and interference correlation matrix. The stationary condition further includes calculating the interference correlation. The migration condition further includes calculating range migration matrix from the target motion.

5 Claims, 18 Drawing Sheets

1500

Table 1 Radar Parameters

| Parameter 1510 | Value 1520 |
|---|---|
| Operating Frequency | 15.728 GHz |
| Instantaneous Bandwidth | 40 MHz |
| Number of Pulses | 10 |
| Number of Chips | 15 |
| Pulse Repetition Frequency (PRF) | 1 KHz |

| Table of Symbols 1600 ||| 
|---|---|---|
| Symbol 1610 | Definition 1620 | Source of Information 1630 |
| $\alpha$ | Complex target voltage amplitude. | This is an unknown parameter determined by the target size and precise range. |
| c | Speed of light. | |
| c(t) | Complex clutter voltage. | Clutter voltage is a random process whose amplitude cannot be predetermined, but its statistics can be estimated. |
| c(t) | Column vector of discrete time sampled complex clutter voltages at slow time t. | Clutter voltage is a random process... |
| c(t;i) | Vector of the same size as c(t) with all elements being zero except the $i^{th}$ element which is equal $c(t)_{(i)}$. | Clutter voltage is a random process... |
| $\delta(t)$ | Dirac delta function. | |
| $\delta_k$ | Column vector representation of the Kronecker delta function with all elements equal to zero except element k, which is set to one. | The radar determines the value of k, which establishes the range cell under test (i.e., the range cell where a detection decision is being made). |
| $\Delta\theta_{az}(t)$ | Change in azimuth angle over the course of the CPI. | This value is determined by the geometry and speed of the radar. |
| e | Euler's number = 2.71828 . . . | |
| exp(x) | $e^x$ for exponent x. | |
| E{ } | Expectation operator. | |
| $f_d$ | Doppler frequency. | Determined by target range rate relative to the radar. |
| g(t) | Unity variance complex Gaussian random variable. | From assumption. |
| $G_{ant}(\theta,\varphi)$ | Two way antenna voltage gain as a function of azimuth ($\theta$) and elevation ($\varphi$) angles. | The antenna gain is determined by the design of the radar antenna. This is usually measured in an antenna range. |
| GRP | Ground Reference Point. Center of the resolution cell. | See FIG. 6A. |
| $\gamma_{X_{GRP}}$ | X position (east/west) of the GRP, assuming flat earth. | Provided by aircraft navigation system. |
| $\gamma_{Y_{GRP}}$ | X position (north/south) of the GRP, assuming flat earth. | Provided by aircraft navigation system. |
| $\gamma_{Z_{GRP}}$ | Z position (altitude) of the GRP, assuming flat earth. | Provided by aircraft navigation system. |
| $\gamma_{X_R}$ | X position (east/west) of the radar, assuming flat earth. | Provided by aircraft navigation system. |
| $\gamma_{Y_R}$ | Y position (north/south) of the radar, assuming flat earth | Provided by aircraft navigation system. |
| $\gamma_{Z_R}$ | Z position (altitude) of the radar, assuming flat earth. | Provided by aircraft navigation system. |
| $h_t(t)$ | Target impulse response. | This function is assumed known by hypothesis, such as the Dirac delta function $\delta(t)$, as a point target. |

Fig. 16A

| Symbol | Definition | Notes |
|---|---|---|
| $h_{t,R(\Delta T)}(t)$ | Target impulse response taking into account the range change over the course of the Coherent Processing Interval. | This function can be calculated based on the hypothesis of the target impulse response function and the target assumed range versus time function R(t). |
| $h_t$ | Column vector of discrete time sampled target impulse function | This vector is assumed known by hypothesis. The most common assumed version of $h_t$ is that of a vector with all elements equal to zero except the element which corresponds to the target range, which is a point target. |
| $h_{t,R(O)}$ | Column vector of discrete time sampled target impulse function valid at the beginning of the Coherent Processing Interval. | This vector is assumed known by hypothesis. The most common assumed version of $h_t$ is that of a vector with all elements equal to zero except the element which corresponds to the target range corresponding to R(O), which is a point target. |
| $H_0$ | Hypothesis that the target is not present. | |
| $H_1$ | Hypothesis that the target is present | |
| $\eta$ | Detection threshold. | The detection threshold is set to guarantee a maximum probability of false alarm. It's value is determined from the radar receiver noise power $\sigma^2_n$. |
| i | Integer index | |
| I | Identity matrix, i.e., a matrix with ones on the diagonal and all other elements equal to zero | |
| j | Square root of -1. | |
| k | Integer index. | |
| l | Integer index. | |
| $\lambda$ | Wavelength of radar signal. | This parameter is determined by the radar's hardware design. |
| m | Integer indexing the pulse number. | |
| M | Number of pulses in the Coherent Processing Interval. | This parameter is determined by the radar's hardware design. |
| $M_C$ | Time correlation matrix of the clutter | This matrix can be estimated by measurements of the radar or by clutter models. See eqn. (31) |
| $M_{C_A}$ | The time correlation matrix of the clutter that actually exists. | This is used in calculating performance of the radar when the detector is mismatched. |
| $M_{C_D}$ | The time correlation matrix of the clutter that the detector is designed to as opposed to the clutter time correlation that the radar actually sees. | This is used in calculating performance of the radar when the detector is mismatched. |
| n | Vector of Additive White Gaussian Noise (AWGN). | The statistical properties of n are generally determined by the radar front end low noise amplifier. The AWGN is justified if the data passes through an ideal filter and is sampled at the Nyquist rate. |
| N | Number of samples of support for the radar pulse. | This parameter is determined by the radar's hardware design. |

FIG. 16B

| | | |
|---|---|---|
| P | This parameter determines the number of samples in the receive interval for each pulse. | This parameter is determined by the radar's hardware design. |
| $\phi(m,n)$ | Target phase angle as a function of pulse number and sample number. | This value is determined by the target motion model and the radar's wavelength. It captures phase change over the pulse time. |
| R(t) | Target range as a function of time. R(0) is the target range as at the beginning at Coherent Processing Interval. | This function is assumed known by hypothesis. Note that targets with unknown dynamics can be detected with a bank of detectors with different R(t) functions similar to pulse Doppler radars do with banks of Doppler filters. |
| $R_C$ | Spatial correlation Matrix for the clutter. | See eqn. (17) |
| $R_{CA}$ | The Spatial correlation Matrix for the clutter that the radar actually sees. | This is used in calculating performance of the radar when the detector is mismatched. |
| $R_{CD}$ | The Spatial correlation Matrix for the clutter that the detector is designed for as opposed to what the radar actually sees. | This is used in calculating performance of the radar when the detector is mismatched. |
| $R_c(i)$ | Square matrix the same size as $R_C$ with all elements equal zero except the $(i,i)^{th}$ element which is equal to the $(i,i)^{th}$ element of $R_C$. | See eqn. (147). |
| $R_g^i(\tau)$ | Time correlation function of clutter at range cell i. Note that under certain conditions this function is the same for all values of i. | This function can be estimated by measurements in the radar, by clutter models, or by knowledge of the radars motion relative to clutter and knowledge of the radar's antenna pattern (see US Patent 9,857,455). |
| $R_{GRP}(t)$ | Range to the ground reference point (i.e., center of resolution cell). | This is determined by radar paprameters and geometry. See FIG. 6 and eqn. (126). |
| $R_{GRP}^i(t)$ | Range to the $i^{th}$ ground reference point. | This is determined by radar paprameters and geometry. See FIG. 7 and eqn. (128). |
| $R_I$ | Correlation Matrix for the interference processes that include clutter and noise. | See eqn. (14). |
| $R_{IA}$ | The Correlation Matrix for the interference processes include clutter and noise actually presented to the radar. | This is used in calculating performance of the radar when the detector is mismatched. |
| $R_{ID}$ | The Correlation Matrix for the interference processes that include clutter and noise that the detector is designed to as opposed to the actual Correlation Matrix. | This is used in calculating performance of the radar when the detector is mismatched. |
| $\tilde{R}_m(i)$ | Range migration matrix. Multiplication by this matrix convolves the sinc function to account for range movement during the coherent processing interval for the $i^{th}$ pulse. | The range migration matrix is calculated under eqn. (46) based on the radar design parameters and knowledge of R(t) (which is assumed by hypothesis). |

FIG. 16C

| | | |
|---|---|---|
| $\tilde{R}'_m(i)$ | Correlation of the range migration matrix as in eqn. (6). | This matrix moves the target in the opposite direction. Note that $\tilde{R}'_m(i)R_m(i) = I$ |
| $R_{y_c}$ | Correlation matrix of $Y_c$. | See eqn. (30). |
| $s(t)$ | Baseband representation of transmitted pulse. | The transmitted pulse is determined by the radar hardware design. |
| $s$ | Vector whose elements are the sampled values of $s(t)$. | The transmitted pulse is determined by the radar hardware design. |
| $\tilde{S}$ | Signal convolution matrix. Multiplication by $\tilde{S}$ performs the operation of convolution. | Determined by $s$, $N$ and $P$, which are all determined by the radar hardware design. |
| $\tilde{S}_m$ | Signal convolution matrix. Multiplication by $\tilde{S}_m$ performs the operation of convolution where the waveform may be different pulse to pulse. | Determined by $s_m$, $N$ and $P$, which are all determined by the radar hardware design. |
| $\tilde{S}_d(m)$ | Signal convolution matrix that has the includes the target Doppler for the $m^{th}$ pulse. | Determined by $s$, $N$ and $P$, which are all determined by the radar hardware design and knowledge of $R(t)$. |
| $\tilde{S}_{m,d}(m)$ | Signal convolution matrix that has the includes the target Doppler for the $m^{th}$ pulse where the waveform may be different pulse to pulse. | Determined by $s_m$, $N$ and $P$, which are all determined by the radar hardware design and knowledge of $R(t)$. |
| $\tilde{S}_c(m)$ | Signal convolution matrix that has the includes the clutter Doppler for the $m^{th}$ pulse. | Determined by $s$, $N$, and $P$, which are all determined by the radar hardware design and knowledge of $R_{GPR_0}(t)$. |
| $\sigma_i^2$ | Clutter power for range cell $i$. | The clutter power can be estimated by measurements from the radar or from clutter models. |
| $\sigma_n^2$ | Receiver noise power | The receiver noise power is a radar design parameter. |
| $\sigma_{n_A}^2$ | Actual receiver noise power. | This is used in calculating performance of the radar when the detector is mismatched. |
| $\sigma_{n_D}^2$ | Designed receiver noise power for the detector. | This is used in calculating performance of the radar when the detector is mismatched. |
| $t$ | Time variable | |
| $T_i$ | Time between transmission of radar pulses. | This parameter is determined by the radar hardware design. |
| $T_{rx\_delay}$ | Time delay from the beginning of the radar transmitted pulse and the first receive sample recorded. | This parameter is determined by the radar hardware design. |
| $T_s$ | Time between digital samples of the received signal. | This parameter is determined by the radar hardware design. |
| $T_i$ | Clutter mean power at range cell $i$. | This determined by the clutter scene presented to the radar. It can be estimated by online measurements from the radar or by a clutter model. |
| $u_i$ | Complex value corresponding to the phase of the target return due to target motion for pulse $i$. | See eqn. (23). |

FIG. 16D

| | | |
|---|---|---|
| $u$ | Vector of $u_i$'s. | See eqn. (23) |
| $u_A$ | Actual vector of phase per pulse due to target motion | This is used in calculating performance of the radar when the detector is mismatched. |
| $u_D$ | Design vector of phase per pulse that the detector uses as opposed to the actual vector. | This is used in calculating performance of the radar when the detector is mismatched. |
| $V_r$ | Radar velocity. | |
| $x_{corr}$ | Complex output of a correlator for the range cell under test | |
| $y$ | Vector of time sampled receive data for one inter-pulse period. | Output radar data in detector 590 illustrated in FIG. 5. |
| $y_c$ | Vector of time sampled receive data for one inter-pulse period due to the target. | Output radar data in detector 590 illustrated in FIG. 5. |
| $y_i$ | Vector of time sampled receive data for one inter-pulse period due to the interference process (clutter and noise). | Output radar data in detector 590 illustrated in FIG. 5. |
| $y_n$ | Vector of time sampled receive data for one inter-pulse period due to noise. | Output radar data in detector 590 illustrated in FIG. 5. |
| $y_t$ | Vector of time sampled receive data for one inter-pulse period due to the target. | Output radar data in detector 590 illustrated in FIG. 5. |
| $Y$ | Vector of time sampled receive data for all inter-pulse periods. This vector is a vertically stacked version of all the $y$'s. | Output radar data in detector 590 illustrated in FIG. 5. |
| $Y_c$ | Vector of time sampled receive data for all inter-pulse periods due to clutter. This vector is a vertically stacked version of all the $y_c$'s. | Output radar data in detector 590 illustrated in FIG. 5. |
| $Y_I$ | Vector of time sampled receive data for all inter-pulse periods due to interference processes (clutter and noise). This vector is a vertically stacked version of all the $y_i$. | Output radar data in detector 590 illustrated in FIG. 5. |
| $Y_n$ | Vector of time sampled receive data for all inter-pulse periods due to noise. This vector is a vertically stacked version of all the $y_n$'s. | Output radar data in detector 590 illustrated in FIG. 5. |
| $Y_t$ | Vector of time sampled receive data for all inter-pulse periods due to the target. This vector is a vertically stacked version of all the $y_t$'s. | Output radar data in detector 590 illustrated in FIG. 5. |

FIG. 16E

| | | |
|---|---|---|
| $z_{corr+MTD'}$ | Complex voltage output of correlation (in fast time) and Doppler processing (slow time) for the range cell under test. See eqn. (50). | Output of standard radar processing before, detection decision. The detection decision is usually made on the absolute value of $z_{corr+MTD'}$. |
| $z_{corr+MTD_T}$ | Complex voltage output of correlation (in fast time) and Doppler processing (slow time) for the range cell under test due to the target. See eqn. (52). | |
| $\rho_{j,k}$ | Time correlation coefficient of clutter between the $j^{th}$ and $k^{th}$ pulses. | This information can be estimated by measurements in the radar, by clutter models, or by knowledge of the radars motion relative to clutter and knowledge of the radar's antenna pattern (see US Patent 9,857,455). |
| $\bar{\rho}_{j,k}$ | Diagonal matrix of clutter correlation coefficients. The row/column indicates the range, j and k indicate this is the correlation coefficient between the $j^{th}$ and $k^{th}$ pulses. | This information can be estimated by measurements in the radar, by clutter models, or by knowledge of the radars motion relative to clutter and knowledge of the radar's antenna pattern (see US Patent 9,857,455). |
| $\theta_{az}$ | Azimuth angle between the radar velocity vector and Ground Reference Point. | This is determined by the direction of travel of the radar, the antenna look angle. |
| $\theta_{cone}$ | Cone Angle between the radar velocity vector and Ground Reference Point. | See eqn. (122). |
| $\theta_{el}$ | Elevation angle between the radar velocity vector and Ground Reference Point. | This is determined by the direction of travel of the radar, the antenna look angle. |
| $\theta_{P\_az}$ | Azimuth pointing angle of antenna. | This angle may be controlled by the radar (if the antenna is mechanically scanned or is phased array). Otherwise, it is determined by antenna design and installation. |
| $\theta_{P\_el}$ | Elevation pointing angle of antenna. | This angle may be controlled by the radar (if the antenna is mechanically scanned or is phased array). Otherwise, it is determined by antenna design and installation. |
| $\zeta_\tau(\theta)$ | Random variable that represents clutter backscatter voltage as a function of time t and azimuth angle θ. The radar observes the clutter backscatter once it has been integrated over the antenna beam in azimuth as shown in eqn. (151). | |

FIG. 16F

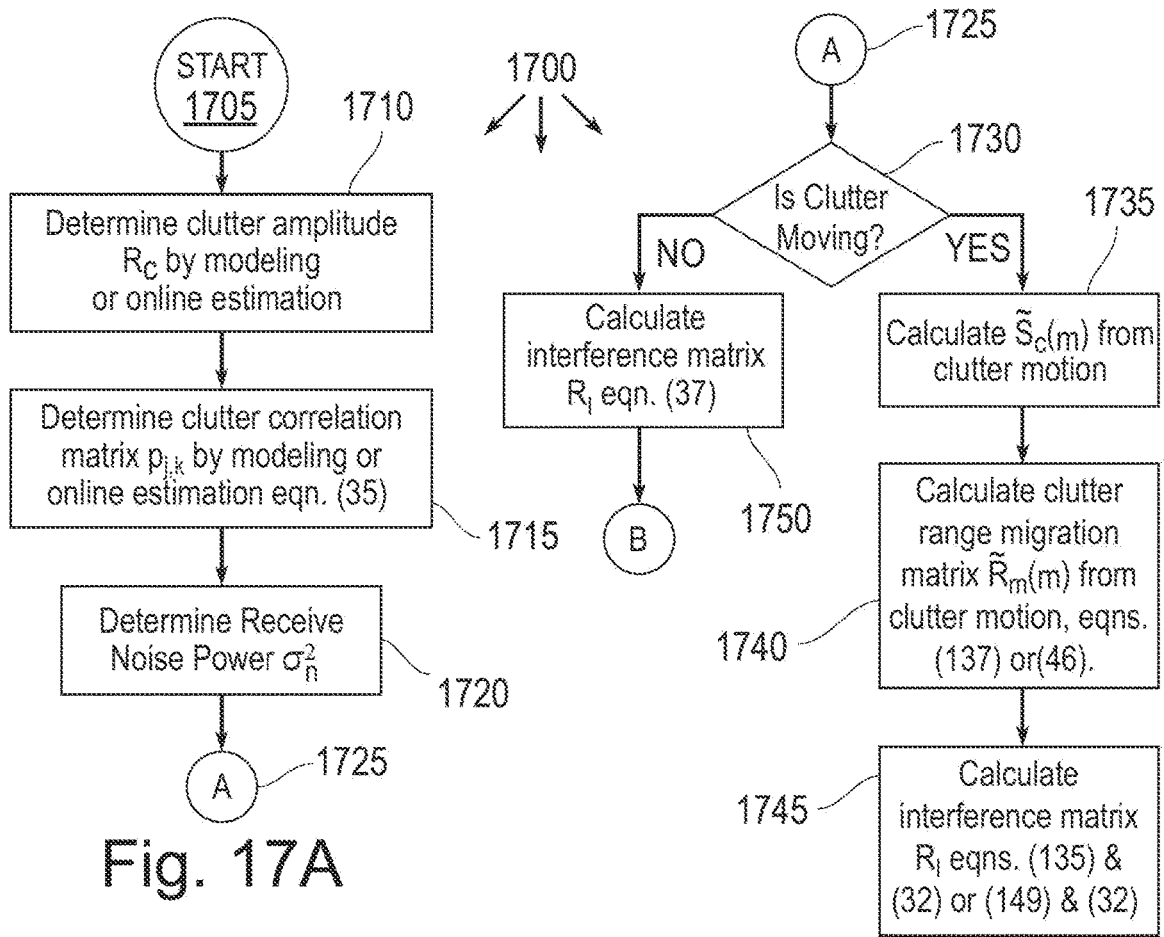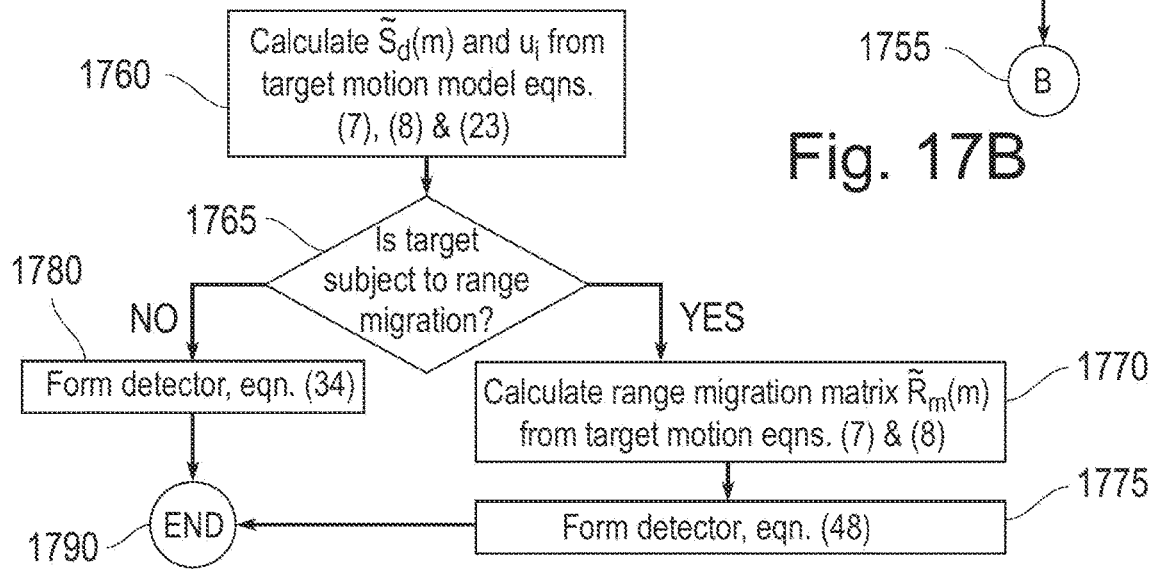

RADAR DETECTION OF MIGRATING TARGETS USING AN INTERFERENCE CORRELATION MATRIX

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to radar detection of targets. In particular, the invention relates to detecting a target that moves relative to the radar, thereby altering its range.

SUMMARY

Conventional radar detection techniques yield disadvantages addressed by various exemplary embodiments of the present invention. In particular, various exemplary embodiments provide computer-implemented method is provided for detecting a target amidst clutter by a radar system able to transmit an electromagnetic signal, receive first and second echoes respectively from the target and the clutter, and process the echoes. The method includes determining signal convolution matrix for the target and a target return phase, clutter amplitude by spatial correlation matrix of clutter, clutter correlation matrix, receive noise power; querying whether the clutter moves as a motion condition if satisfied and as a stationary condition otherwise; calculating signal convolution matrix and target return phase from the signal convolution matrix and the target return phase for target motion; querying whether the target has range migration as a migration condition if satisfied and as a non-migration condition otherwise; and forming a target detector for the radar. The motion condition further includes calculating signal convolution matrix from clutter motion, clutter range migration matrix from the clutter motion, and interference correlation matrix. The stationary condition further includes calculating the interference correlation. The migration condition further includes calculating range migration matrix from the target motion.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 16A, 16B, 16C, 16D, 16E and 16F are tabular views of a lexicographical list of symbols and definitions; and FIGS. 17A, 17B and 17C are a flowchart view of radar signal process operations for detecting a target.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component. The disclosure generally employs quantity units with the following abbreviations: signal strength in decibels (dB), energy in joules (J), and frequencies in hertz (Hz).

Section I—Clutter Cancellation and Correlation: There is currently no method to enable a radar to suppress clutter under the situation that targets (or clutter) move across range cells over the time of a coherent processing interval (CPI). The reason for this is that compensating for range walk (or range migration) decorrelates the clutter. Clutter cancellation depends on the correlation properties of clutter. Hence, decorrelating the clutter destroys the radar's ability to cancel clutter. This problem can be visualized with some simple illustrations.

Figure 1:
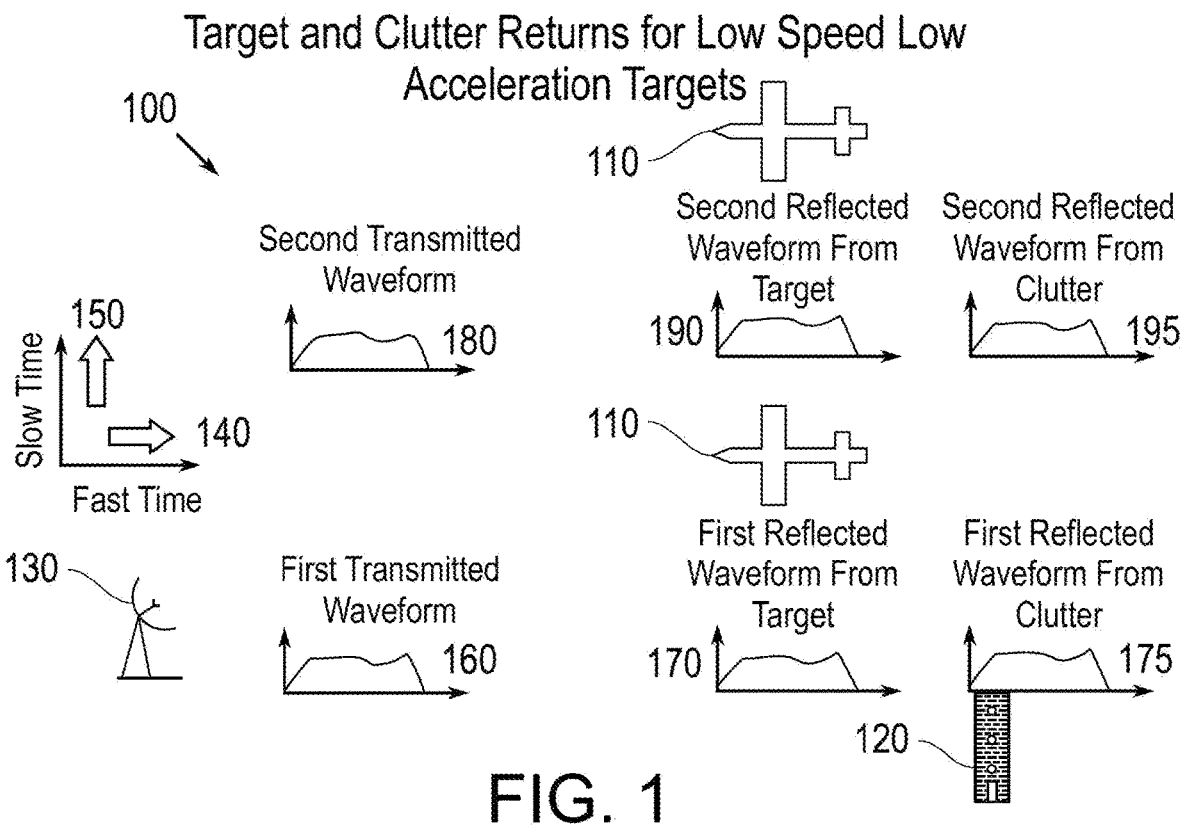
FIG. 1 is an elevation diagram view of radar pulse returns from a slow target.

FIG. 1 shows an elevation diagram view 100 of target and clutter returns for low speed low acceleration targets 110 to be distinguished from clutter 120 (that is stationary) by a radar platform 130, which transmits pulses having waveform profiles for Fast Time 140 and Slow Time 150. The radar 130 emits a first transmitted waveform 160 and receives a first target reflection waveform 170 and a first clutter reflection waveform 175. Subsequently, the radar 130 emits a second transmitted waveform 180 and receives a second target waveform 190 and a second clutter waveform 195. The shapes of the returned waveforms 175 and 170 are nearly identical between clutter 120 and the target 110. Additionally, the subsequent pulses 190 from the target 110 occur in the same range cells as the first received pulse 170. However, there is a Doppler difference in the target return 190 and the clutter return 195 that enables the radar 130 to detect the target 110 and reject the clutter 120.

Figure 2:
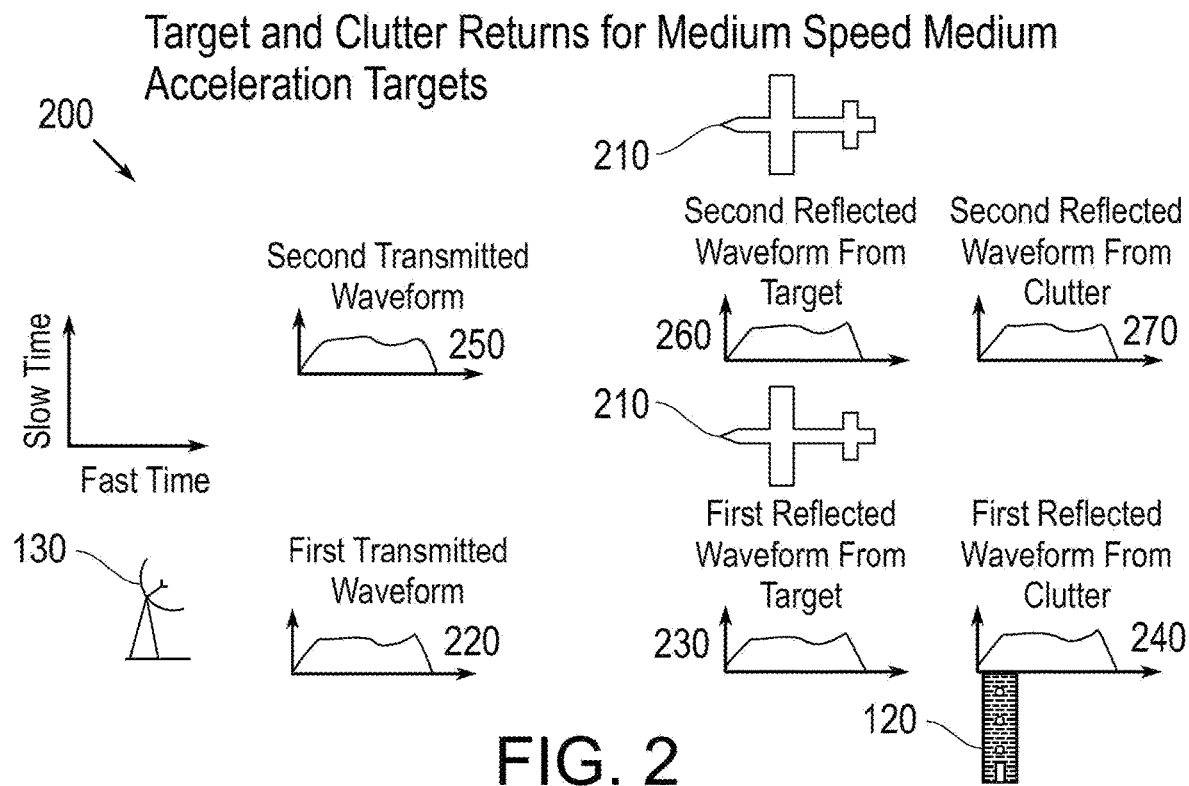
FIG. 2 is an elevation diagram view of radar pulse returns from a medium speed target.

FIG. 2 shows an elevation diagram view 200 for a target 210 having medium speed and medium acceleration for detection by the radar 130 against the stationary clutter 120 with waveform profiles analogous to view 100. The radar 130 emits a first transmitted waveform 220 and receives a first target reflected waveform 230 and a first clutter reflected waveform 240. Subsequently the radar 130 emits a second transmitted waveform 250 and receives a second target reflected waveform 260 and a second clutter reflected waveform 270. The target 210 causes range migration, but pulse distortion can be ignored. The shapes of the returned waveforms 240 and 230 are still nearly identical between stationary clutter 120 and the target 210. However, subsequent pulses 260 from the target 210 occur in different range cells than the first received pulse 230, producing an offset. Also, there is an even larger Doppler for the target 210 that may change from pulse-to-pulse due to acceleration.

Figure 3:
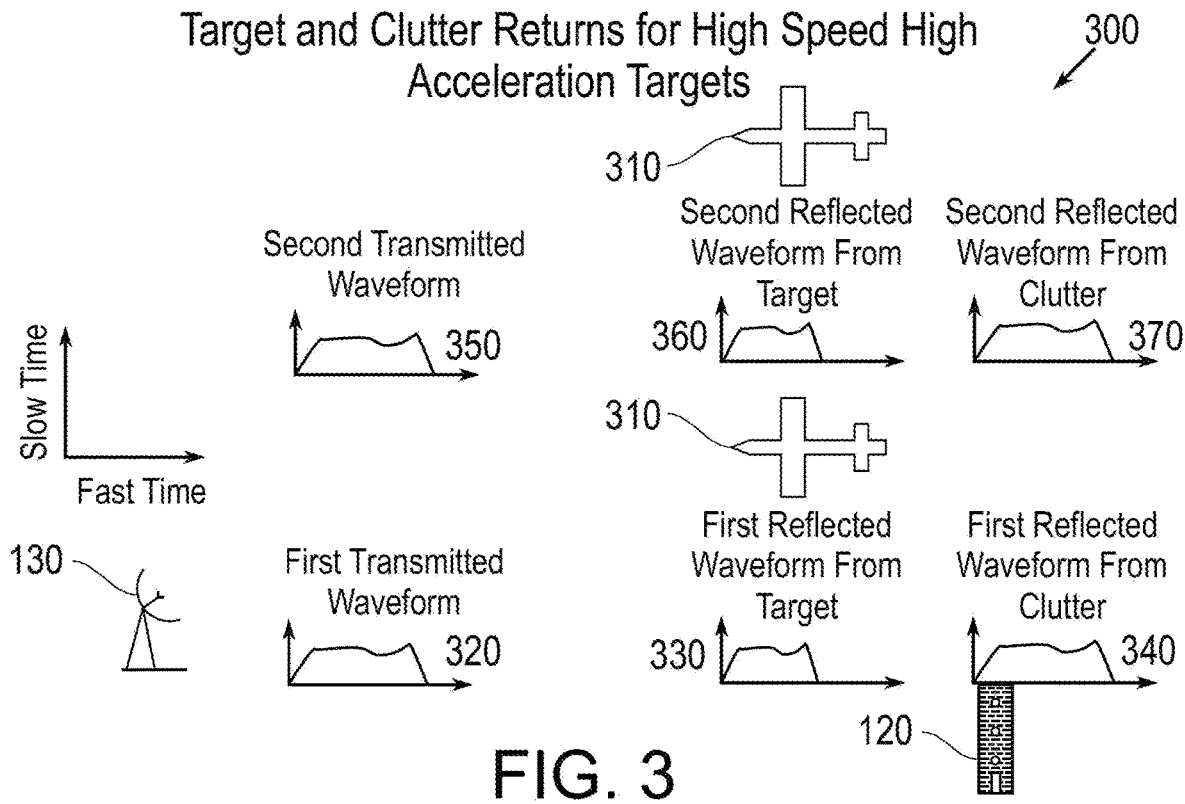
FIG. 3 is a first elevation diagram view of radar pulse returns from a fast target.

FIG. 3 shows an elevation diagram view 300 for a target 310 having high speed and high acceleration for detection by the radar 130 against the stationary clutter 120 with waveform profiles analogous to view 100. The radar 130 emits a first transmitted waveform 320 and receives a first target reflected waveform 330 and a first clutter reflected waveform 340. Subsequently the radar 130 emits a second transmitted waveform 350 and receives a second target reflected waveform 360 and a second clutter reflected waveform 370. The target's motion causes range migration analogous to view 200, as well as pulse distortion. The shape of the returned waveform 330 from the target 310 differs significantly from returned waveform 340 from the stationary clutter 120. Additionally, subsequent pulses 360 from the target 310 occur in different range cells as the first received pulse 330, producing an offset. Also, there is an even larger Doppler for the target 310 that may change from pulse-to-pulse due to acceleration.

Figure 4:
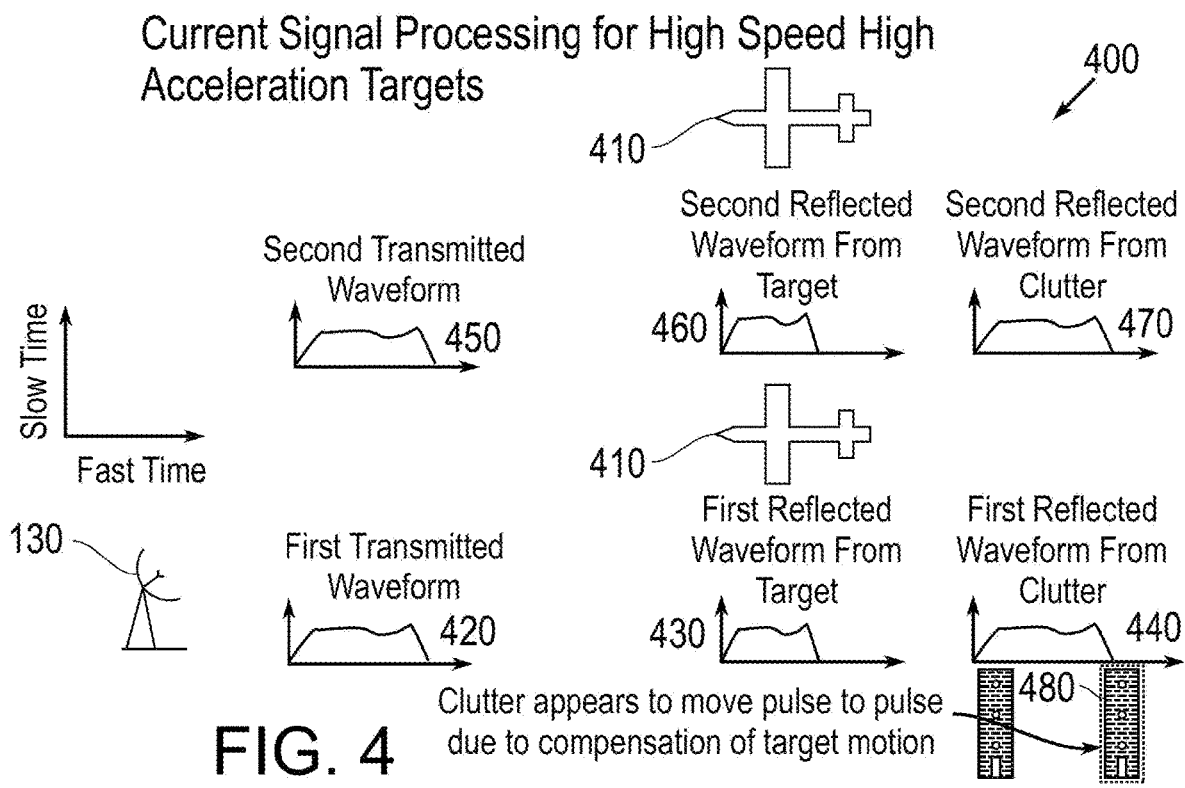
FIG. 4 is a second elevation diagram view of radar pulse returns from a fast target.

FIG. 4 shows an elevation diagram view 400 for a target 410 having high speed and high acceleration for detection by the radar 130 against the stationary clutter 120 with waveform profiles analogous to view 100. The radar 130 emits a first transmitted waveform 420 and receives a first target reflected waveform 430 and a first clutter reflected waveform 440. Subsequently the radar 130 emits a second transmitted waveform 450 and receives a second target reflected waveform 460 and a second clutter reflected waveform 470. As in view 300, the target return pulses 430 and 460 have different (i.e., shorter fast time) waveforms than clutter return pulses 440 and 470. Also, the clutter 120 appears to shift based on the offset of the reflected waveforms 440 and 470, thereby presenting a phantom position 480. View 400 shows range migration compensation and its effect on clutter 120. Conventional signal processing time aligns data from each pulse to ensure that the target return pulses 430 and 460 appear in the same range cell for each transmit pulse 420 and 450, and can compensate for the change impulse shape. This permits the radar 130 to integrate the target returns. Unfortunately, this causes the clutter returns 440 and 470 to move range cells for each transmit pulse 420 and 450. When this happens, the effect destroys the radars ability to cancel the clutter 120 via Doppler processing.

One can begin with the case where the target motion over the course of the coherent processing interval (CPI) is small compared to the range resolution of the radar 130. This case is illustrated in view 100, which illustrates fast time/distance 140 being represented by the horizontal dimension. The vertical dimension represents slow time 150 (i.e., time between pulses of the radar). View 100 shows the radar 130 transmitting two pulses 160 and 180. The radar's field of view includes an airplane, which is moving and thereby represents a target 110, and a building, which remains stationary and represents clutter 120. The target motion is slow enough that it appears not to change range from the time of one pulse transmission to the next transmission. View 200 illustrates the case where the target 210 is flying fast enough that the radar 130 observes it in different range cells from on pulse to the next. That is the range change from the time of the first transmitted pulse to the second transmitted pulse is observable.

The Doppler processing integrates energy pulse-to-pulse. In other words, it sums energy for a given range cell across slow time. Therefore, in the case of view 200, the target energy appears to leak between range cells, thus it is lost. Therefore, if range migration is not compensated there is a signal loss on the target. View 300 illustrates the case of targets 310 traveling so fast that in addition to range migration, the reflected pulse shape is also distorted. This is caused by the observable motion over the course of a pulse width. In this disclosure, the narrow band assumption is used. There are techniques to compensate for range migration and pulse distortion. However, performing this compensation on the received data decorrelates radar clutter. This is illustrated in view 400. As shown, the target returns are aligned, and consequently the clutter returns are misaligned causing serious degradation in clutter cancellation.

Figure 5:
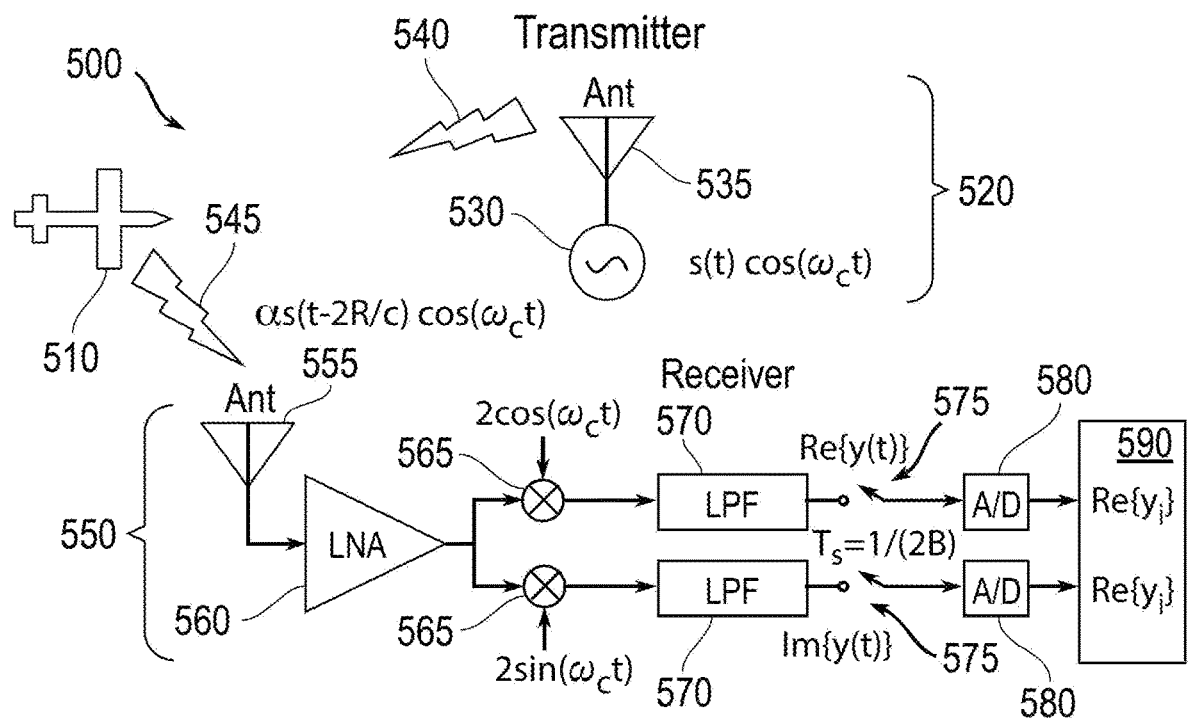
FIG. 5 is a schematic diagram view of radar hardware.

FIG. 5 shows a schematic diagram view 500 of hardware for the radar 130 to detect a generic target 510. A transmitter 520 includes a signal oscillator 530 and a transmit antenna 535. The transmitter 520 emits a transmit pulse signal 540 that the target 510 reflects as a reflection signal 545. The pulse signal 540 can be repeated at intervals corresponding to a pulse repetition frequency (PRF). A receiver 550 receives the reflection signal 545 by a receive antenna 555. A low noise amplifier (LNA) 560 divides the received signal into real and imaginary components to corresponding pairs of mixers 565, low pass filters (LPF) 570, switches 575 and analog-to-digital (A/D) converters 580 to a detector 590 into their respective real (Re) and imaginary (Im) signals.

The radar hardware is diagramed in view 500. The radar transmitter 520 generates and amplifies the transmit signal 540 which is radiated through the antenna 535. The reflection signal 545 then propagates to the target 510 and then is reflected from the target 510 and is received by the antenna 555. The LNA 560 amplifies the received signal. Following amplification, this signal is synchronously down converted to baseband; producing the complex in-phase (real) and quadrature (imaginary) signals that are available to be processed in order to detect the target 510. Following the down conversion, the analog signals are digitized at the Nyquist rate. The output of the A/D converters 580 enables a detection decision to be made. The transmitter 520 transmits and receives multiple coherent pulses 540 in order to make a detection decision. The receiver 550 is gated on (i.e., switches 575 closed) during the listen time for each pulse. The radar 130 maintains timing to align in time and phase the fast and slow time data. Note that fast time data are the receiver output due to the echoes produced by one pulse. Slow time 150 indexes the subsequent periods of fast time 140.

Section II—Slow Moving Target: The first detector 590 developed will be for a slow moving target (i.e., range migration can be ignored). This detector 590 is optimal in that it maximizes the probability of detection for a specified probability of false alarm subject to the assumptions invoked in the text. The derivation jointly processes the fast time and slow time information to improve detectability. The input of this detector 590 is the complex baseband data as shown in view 500.

Subsection (a) Single Pulse: First presented is the case for a constant velocity target with a range rate and CPI time that satisfies:

$$\dot{R}(t)MT_i \ll \frac{cT_s}{2}, \quad (1)$$

where $R(t)$ is the target range as a function of time $\dot{R}(t)=dR(t)/dt$ is the target range rate as a function of time, M is the number pulses, $T_i$ is the time between pulses, $T_s$ is the sample time, and c is the speed of light. Further, this analysis is at complex baseband. The transmitter 520 of the radar 130 transmits signal s(t) 540 in the direction of the target 510. The response of the receiver 550 to the reflected signal 545 is:

$$y_i(t) = s(t) * \alpha h_i\left(t - \frac{2R(t_0)}{c}\right), \quad (2)$$

where $\alpha$ is the complex amplitude of the target 510, $h_t(t)$ is the impulse response of the target 510, and $t_0$ is the start of the CPI. For point targets $h_t(t)$ is the Dirac delta function $\delta(t)$. Because the radar's receiver 550 produces data sampled by an A/D converter 580, the convolution in eqn. (2) can be approximated by a discrete time convolution as follows:

$$y_i(kT_s) = \alpha \sum_{i=0}^{N-1} s(iT_s)h_i\left((k+1-i)T_s - \frac{2R(t_0)}{c}\right), \quad (3)$$

where $T_s$ is the sample time interval and N is the total number of time samples that contain the transmitted pulse 540.

The operation in eqn. (3) can be written in matrix notation as:

$$y_t = \alpha \tilde{S} h_t \quad (4)$$

where $y_t$ is a time-sampled receive signal column vector of size (P+N−1) and whose elements are the discrete time samples of $y_i(iT_s)$ and $h_t$ is a target impulse column vector of size (P+2(N−1)) and whose elements are the time samples of $h_t(iT_s - 2R/c)$ in reverse range order and:

$$\tilde{S} = \begin{bmatrix} 0 & \cdots & 0 & s^t \\ 0 & \cdots & s^t & 0 \\ & \ddots & & \\ s^t & 0 & \cdots & 0 \end{bmatrix}, \quad (5)$$

which is a rectangle matrix with a size of (P+N−1)×(P+2(N−1)). The matrix $\tilde{S}$ is sometimes called a convolution matrix. Note that $NT_s$ is the pulse width, (P+N−1) is the length of the received data, and (P+2(N−1)) is the number of range cells that influence the inter-pulse period (IPP). The received data's length constitutes the number of samples received during the IPP. Note for a point target, all elements of target impulse vector $h_t$ are zero except the element that corresponds to the range cell that the target 510 is within. This element will be unity.

The target model in eqn. (4) is adequate for stationary targets or targets 110 whose Doppler can be ignored. The target Doppler manifests itself in the receive data as a phase change from sample to sample. This can be accounted for by modifying the target model as follows:

$$y_t = \alpha \tilde{S}_d(m) h_t, \quad (6)$$

where m is the pulse number that becomes relevant in Subsection (b), $$\tilde{S}_d(m) = \begin{bmatrix} 0 & \cdots & s_1 & s_2 e^{j\phi(m,1)} & \cdots & s_N e^{j\phi(m,N-1)} \\ & & & \vdots & & \\ s_1 & s_2 e^{j\phi(m,1)} & \cdots & s_N e^{j\phi(m,N-1)} & \cdots & 0 \end{bmatrix}, \quad (7)$$

where $s_1$ are the elements of sample vector s of the radar's transmit pulse, and target phase angle is:

$$\phi(m,n) = \frac{4\pi(mT_i + nT_s - R(mT_i))}{\lambda}, \quad (8)$$

where $\lambda$ is the wavelength. In eqn. (6), the target's position and impulse response is represented in $h_t$ and the target's Doppler is represented in $\tilde{S}_d(m)$. Note that if the target 510 is constant velocity, then phase angle $\phi$ will only be a function of n. In a similar manner the receiver response to the clutter 120 is:

$$y_c(t) = s(t) * c(t), \quad (9)$$

where c(t) is the fast time complex random process due to clutter back-scatter.

Similarly, the sampled response to clutter 120 can be written as:

$$y_c = \tilde{S} c, \quad (10)$$

where the clutter vector c is a column vector of size (P+2(N−1)) whose elements are the complex clutter impulse response in reverse range (i.e., fast time) order. The receiver's response to noise can be written as:

$$y_n = n, \quad (11)$$

where $y_n$ and n are column vectors of length (P+N−1). The noise is assumed to be zero mean additive white Gaussian noise (AWGN). The combined receiver response then is:

$$y = y_t + y_c + y_n = \alpha \tilde{S}_d h_t + \tilde{S} c + n. \quad (12)$$

The interference response of the receiver is:

$$y_l = y_c + y_n = \tilde{S}c + n. \tag{13}$$

The correlation matrix for the interference process can be determined as:

$$R_I = E\{y_l y_l^H\} = E\{(\tilde{S}c+n)(\tilde{S}c+n)^H\}, \tag{14}$$

where $E\{\ \}$ denotes an expectancy function, and the superscript H indicates conjugate transpose.

By assumption, both clutter vector c and noise vector n are zero mean and independent processes that gives:

$$E\{(\tilde{S}cn^H)\} = E\{nc^H\tilde{S}^H\} = 0. \tag{15}$$

Additionally, vector n is AWGN, which gives:

$$E\{(nn^H)\} = \sigma_n^2 I, \tag{16}$$

where $\sigma_n^2$ of is the noise variance (i.e., power) and I is a $(P+N-1)\times(P+N-1)$ identity matrix. Next, one can assume that the clutter voltages are uncorrelated cell to cell because the clutter voltage from each cell has a random initial phase. This phase is uniformly distributed zero to $2\pi$ and will be inter-cell independent. This gives spatial correlation matrix for the clutter 120 as:

$$R_c = E\{cc^H\} = \begin{bmatrix} \sigma_1^2 & 0 & \cdots & 0 \\ 0 & \sigma_2^2 & \cdots & 0 \\ & & \vdots & \\ 0 & 0 & \cdots & \sigma_{P+2(N-1)}^2 \end{bmatrix}, \tag{17}$$

where $\sigma_i^2$ is the clutter variance (power) at range cell i. Having eqn. (17) now enables one to write the interference correlation matrix as:

$$R_I = R_{y_c} + R_{y_c} = \tilde{S}R_c\tilde{S}^H \sigma_n^2 I. \tag{18}$$

Clutter seen by a moving radar is addressed in Section III Subsection (a).

One can now invoke the assumption that clutter 120 is a compound Gaussian process. The compound Gaussian model states that the clutter voltage at any range cell i at time i is defined as:

$$c_i(1) = \sigma_i g_i(t), \tag{19}$$

where $\sigma_i$ is a random variable that is equal to the square root of the variance (power) at range cell i, and $g_i(t)$ is a unity variance complex Gaussian process that accounts for the pulse-to-pulse variance of the clutter complex amplitude. The correlation function of the clutter 120 is:

$$R_g^i(\tau) = E\{g_i(t+\tau)g^*_i(t)\}, \tag{20}$$

which defines the clutter spectral characteristics. The autocorrelation of a random process and its power spectral density form a Fourier transform pair. The process $\sigma_i$ is often called the texture, and $g_i(t)$ is called the speckle. This model accounts for the significant changes of clutter amplitude from range cell to range cell as well as the Doppler spectrum properties of the clutter 120. The clutter's Doppler spectrum then is the Fourier transform of the time correlation function. If the clutter 120 is compound Gaussian, and the clutter variance is known, then the resulting clutter distribution is Gaussian. In other words, if clutter variance $\sigma_i^2$ is known (through online measurement and estimation or through clutter modeling) then the clutter's spatial correlation matrix $R_c$ in eqn. (17) is known. This in turn means the interference process as perceived by the radar receiver in $y_l$ is a Gaussian random process whose correlation matrix is determined in eqn. (18). If interference process is Gaussian, then the Neyman-Pearson (N-P) detector 590 can be formed by:

$$|h_i^H \tilde{S}_d^H R_I^{-1} y| \underset{H_0}{\overset{H_1}{\underset{<}{>}}} \eta, \tag{21}$$

where the value of detection threshold $\eta$ is chosen to achieve the desired probability of false alarm or $P_{fa}$.

Subsection (b) Multiple Pulses: The receiver response to the target 510 is first determined. Under the slow moving target assumption, the target response is identical from pulse-to-pulse except for the phase change that is imparted due to the targets motion from pulse-to-pulse. Thus the receiver response to the target 510 can be represented as stacked vector:

$$Y_t = \alpha \begin{bmatrix} u_0 \tilde{S}_d(0) h_i \\ \vdots \\ u_{M-1} \tilde{S}_d(M-1) h_i \end{bmatrix}, \tag{22}$$

where $u_i$ accounts for the phase change from pulse-to-pulse and is computed as:

$$u_i = \exp\left(j4\pi \frac{R(iT_i)}{\lambda}\right), \tag{23}$$

and $\lambda$ is the wavelength and $T_i$ is the pulse repetition interval (PRI). (Recall that j is the imaginary number $\sqrt{-1}$.) The phase change is proportional to the range change as a function of time and is generally ascribed to the Doppler effect. For the case of a non-accelerating targets (i.e, the signal convolution matrix $\tilde{S}_d$ is independent of pulse number), the Kronecker product enables eqn. (22) to be written compactly as:

$$Y_t = u \tilde{S}_d h_t, \tag{24}$$

where u is a column vector whose elements defined in eqn. (23). The size of phase change vector u is M×1, where M is the number of pulses. Therefore, the size of time-sampled receive data matrix Y, is M(N+P−1)×1.

Next the clutter pulse-to-pulse is determined. Using the compound Gaussian model the time correlation function is designated $R_R(\tau)$ defined in eqn. (17). If one assumes that the clutter 120 over the whole range extent is the same type (e.g., sea clutter), then it is not unrealistic to expect that clutter correlation $R_g(\tau)$ is the same for every range cell. This means that for every range cell i there is a random draw of the random variable $\sigma_i$ determining its variance (power) and a random draw of the stationary random process g(t) that is zero mean, unity variance complex Gaussian that is correlated in time according to $R_g(\tau)$. Due to the random and independent initial phase of the clutter voltage, $R_g(\tau)$ is uncorrelated from range cell to range cell as previously discussed. Also, one can assume that the complex Gaussian random processes from one range cell to the next are uncorrelated.

Under these assumptions, one can define c(t) as the column vector of the clutter amplitudes at slow time i (noting that c(t) is a complex random process). One writes the stacked vector representing the response of the receiver due to clutter 120 as:

$$Y_c = \begin{bmatrix} \tilde{S}c(0) \\ \tilde{S}c((i-1)T_i) \\ \vdots \\ \tilde{S}c((M-1)T_i) \end{bmatrix}. \quad (25)$$

The clutter correlation matrix for the stacked vector $Y_c$ is determined as:

$$R_{Y_c} = E\{Y_c Y_c^H\} = \quad (26)$$

$$E\left\{\begin{bmatrix} \tilde{S}c(0)c^H(0)\tilde{S}^H & \ldots & \tilde{S}c(0)c^H((M-1)T_i)\tilde{S}^H \\ & \ddots & \\ \tilde{S}c((M-1)T_i)c^H(0)\tilde{S}^H & \ldots & \tilde{S}c((M-1)T_i)c^H((M-1)T_i)\tilde{S}^H \end{bmatrix}\right\}.$$

This can be rewritten as:

$$R_{Y_c} = \left\{\begin{bmatrix} \tilde{S}E\{c(0)c^H(0)\}\tilde{S}^H & \ldots & \tilde{S}E\{c(0)c^H((M-1)T_i)\}\tilde{S}^H \\ & \ddots & \\ \tilde{S}E\{c((M-1)T_i)c^H(0)\}\tilde{S}^H & \ldots & \tilde{S}E\{c((M-1)T_i)c^H((M-1)T_i)\}\tilde{S}^H \end{bmatrix}\right\}. \quad (27)$$

Each expectation in eqn. (24) can be represented as:

$$E\{c(jT_i)c^H(kT_i)\} = \begin{bmatrix} \sigma_1^2 R_g^1((j-k)T_i) & & 0 \\ & \ddots & \\ 0 & & \sigma_{P+2(N-1)}^2 R_g^{P+2(N-1)}((j-k)T_i) \end{bmatrix}. \quad (28)$$

The result in eqn. (28) is obtained by applying eqn. (17) and invoking the assumption that the clutter 120 is zero mean and uncorrelated cell to cell.

Under the assumption that the clutter 120 has the same Doppler spectrum in each cell, it can be further simplified to eqn. (24). In that case define the time correlation coefficient as:

$$\rho_{j,k} = R_g((j-k)T_i). \quad (29)$$

This enables eqn. (24) for the receive correlation matrix to be written as:

$$R_{Y_c} = \begin{bmatrix} \rho_{1,1}\tilde{S}R_c\tilde{S}^H & & \rho_{1,M}\tilde{S}R_c\tilde{S}^H \\ & \ddots & \\ \rho_{M,1}\tilde{S}R_c\tilde{S}^H & & \rho_{M,M}\tilde{S}R_c\tilde{S}^H \end{bmatrix} = M_c \otimes \tilde{S}R_c\tilde{S}^H, \quad (30)$$

where the time correlation matrix for clutter is:

$$M_c = \begin{bmatrix} \rho_{1,1} & & \rho_{1,M} \\ & \ddots & \\ \rho_{M,1} & & \rho_{M,M} \end{bmatrix}. \quad (31)$$

Remember that spatial correlation matrix $R_c$ (e.g., amplitude) is diagonal because clutter 120 is uncorrelated from range cell to range cell. Note also that time correlation matrix $M_c$ is size M×M.

The complete interference correlation matrix can be written from eqn. (18) as:

$$R_I = R_{Y_c} + \sigma_n^2 I, \quad (32)$$

where $R_{Y_c}$ is defined in eqns. (30) and (31). Note that $R_I$, $R_{Y_c}$, and I are size M(P+N−1)×M(P+N−1). Under the assumption that the Doppler spectrum is the same for all range cells correlation matrix for the interference process can be written as:

$$R_I = M_c \otimes \tilde{S}R_c\tilde{S}^H + \sigma_n^2 I. \quad (33)$$

With the signal model and interference model established the N-P detector 590 for the $h_t$ can be written as:

$$\left\| \begin{bmatrix} u_0 \tilde{S}_d(0) h_i \\ \vdots \\ u_{M-1}\tilde{S}_d(M-1)h_i \end{bmatrix}^H R_I^{-1} Y \right\| \begin{array}{c} H_1 \\ > \\ < \\ H_0 \end{array} \eta, \quad (34)$$

where $\eta$ is the detection threshold which is set to the specified probability of false alarm. The scalars $H_0$ and $H_1$ correspond to the lower and upper values that determine whether the alarm threshold has been satisfied.

Next the case of non-homogeneous clutter 120 is considered. This situation arises when there are clutter boundaries, such as the boundary between land and sea. This situation can be handled by defining the diagonal time correlation matrix $\rho_{j,k}$ of size (P+2(N−1))×(P+2(N−1)). The diagonal elements are determined as:

$$\rho_{j,k} = R_g^i((j-k)T_i), \quad (35)$$

where time correlation of clutter $R_g(t)$ is defined in eqn. (20) and i indicates the range cell number. With this, eqn. (28) can be rewritten as:

$$E\{c(jT_i)c^H(kT_i)\} = \rho_{j,k}R_c. \quad (36)$$

With eqn. (36), the interference correlation matrix can be rewritten as:

$$R_I = \begin{bmatrix} \tilde{S}\rho_{i,1}R_c\tilde{S}^H & & \tilde{S}\rho_{1,M}R_c\tilde{S}^H \\ & \ddots & \\ \tilde{S}\rho_{M,1}R_c\tilde{S}^H & & \tilde{S}\rho_{M,M}R_c\tilde{S}^H \end{bmatrix} + \sigma_n^2 I. \quad (37)$$

Subsection (c)—Fast Target: For this case, the target 310, 410 is moving so fast that its movement pulse-to-pulse relative to the sample interval such that the rate inequality from eqn. (1) is not satisfied. That is the target will move a significant fraction of a range cell from one pulse to the next. This requires some form of range migration compensation such that the target returns can be integrated up. The target model first addresses the range migration issue from pulse-to-pulse. Then the effect of pulse distortion is caused by range migration within a pulse receive time. Finally, the Doppler effect is included with range migration effect. Now the target model can be restated as:

$$y(t) = s(t) * \alpha h_t\left(t - \frac{2R(t)}{c}\right), \quad (38)$$

where the target range changing with time is shown explicitly. In this case the range change from pulse-to-pulse must be accounted for in the detector 590.

As before, eqn. (35) can be approximated by the discrete time convolution indicated by:

$$y_t(kT_s) = \alpha \sum_{i=0}^{N-1} s(iT_s) h_t\left((k+1-i)T_s - \frac{2R(t)}{c}\right), \quad (39)$$

where again the time dependence of R(t) is indicated. This time dependence has the effect of moving the target some significant fraction (or whole) sample times $T_s$. While eqn. (36) is accurate, it is not presented in a convenient form. To address this, the target impulse response is redefined as:

$$h_{t,R(\Delta T)}(t) = h_t\left(t - \frac{2R(\Delta T)}{c}\right), \quad (40)$$

where $\Delta T$ is the time since beginning of the CPI. Thus, eqn. (40) accounts for the range of the target and its change over the course of the CPI. Next one can show how to determine $h_{t,R(\Delta T)}(t)$ in terms of $h_{t,R(1)}(t)$. Remembering that $h_{t,R(0)}(t)$ is effectively discrete time sampled one can account for the sampling time offset induced by the range change of $R(\Delta T)$. This accounts for fractional shifts in the target position (as well as whole sample shifts).

Thus, one has:

$$h_{t,R(\Delta T)}(kT_s) = \sum_i h_{t,R(0)}(lT_s)\mathrm{sinc}\left(\frac{kT_s - \Delta T_s - lT_s}{T_s}\right), \quad (41)$$

where $\Delta T_s = 2[R(\Delta T) - R(0)]/c$ and $\sin c(x) = \sin(\pi x)/\pi x$. Note that eqn. (41) can be interpreted as the discrete time convolution of $h_{t,R(0)}(t)$ with $\sin c(t)$. To determine $y_t(kT_s)$ for subsequent pulses, one can write:

$$y_t(kT_s) = \alpha \sum_{i=0}^{N-1} s(iT_s) h_{i,R(\Delta T)}((k+1-i)T_s), \quad (42)$$

where $\Delta T = (m-1)T$ and in is the pulse number. Next one applies eqn. (41) to give:

$$y_t(kT_s) = \alpha \sum_{i=0}^{N-1} s(iT_s) \sum_i h_{i,R(0)}(lT_s)\mathrm{sinc}\left(\frac{((k+1-i)T_s - \Delta T_s - lT_s)}{T_s}\right). \quad (43)$$

where $\Delta T_s = 2[R(m-1)T_i - R(0)]/c$.

Thus, eqn. (43) can be rewritten to change the order of convolution to give time-sampled receive data for one inter-pulse period:

$$y_t(kT_s) = \alpha \sum_i h_{i,R(0)}(lT_s) \sum_{i=0}^{N-1} s(iT_s)\mathrm{sinc}\left(\frac{((k+1-i)T_s - T_s - lT_s)}{T_s}\right). \quad (44)$$

With the target model as stated in eqn. (41) enables expressing the target model in a manner similar to eqn. (6) as:

$$y_t = \alpha \tilde{R}_m(i)\tilde{S}_d h_{t,R(0)}, \quad (45)$$

where $h_{t,R(0)} = h_t$, $\tilde{S}_d$ is defined in eqn. (7) and $\tilde{R}_m(m)$ is the range migration matrix that convolves the sinc( ) function whose elements are determined as:

$$\tilde{R}_m(m)_{(k,l)} = \mathrm{sinc}\left(\frac{((k-l)T_s - \Delta T_s)}{T_s}\right), \quad (46)$$

where $\Delta T_s = 2[R(mT_i + lT_s) - R(0)]/c$ and $m \in \{0, \ldots, M-1\}$. Note that $\Delta T_s$ is a function of l, the sample number as well as the pulse number in. Including $lT_s$ accounts for the target motion over the time of the pulse width.

One can note that $h_{t,R(0)}$ is column vector of size $(P+2(N-1)) \times 1$, $\tilde{S}_d$ is rectangular matrix of size $(P+N-1) \times (P+2(N-1))$, and $\tilde{R}_m(m)$ is a square matrix of size $(P+N-1) \times (P+N-1)$. Using eqn. (45) one can write the complete (for all pulses) receive target model as:

$$Y_t = \alpha \begin{bmatrix} u_0 \tilde{R}_m(0)\tilde{S}_d(0) h_{t,R(0)} \\ u_1 \tilde{R}_m(1)\tilde{S}_d(1) h_{t,R(0)} \\ \vdots \\ u_{M-1} \tilde{R}_m(M-1)\tilde{S}_d(M-1) h_{t,R(0)} \end{bmatrix}. \quad (47)$$

The detector 590 for fast targets 310, 410 then will be:

$$\left\| \begin{bmatrix} u_0 \tilde{R}_m(0)\tilde{S}_d(0) h_{t,R(0)} \\ u_1 \tilde{R}_m(1)\tilde{S}_d(1) h_{t,R(0)} \\ \vdots \\ u_{M-1} \tilde{R}_m(M-1)\tilde{S}_d(M-1) h_{t,R(0)} \end{bmatrix}^H R_I^{-1} Y \right\| \begin{array}{c} H_1 \\ > \\ < \\ H_0 \end{array} \eta, \quad (48)$$

where the interference correlation matrix $R_I$ is defined in eqn. (32) and $\eta$ is the detection threshold.

Section III—Performance Equations: The processing often done in multiple pulse radars is correlation (i.e., matched filter) in fast time and moving target detection (MTD) in slow time to integrate returns over slow time. Note that MTD is equivalent to pulse Doppler processing. This processing is optimal for targets immersed in AWGN. To simplify this development, the target acceleration will be ignored (targets are assumed to be constant velocity).

Including target acceleration is straightforward. On a per pulse basis, the output of the correlator at range cell k given the receive data vector y is:

$$x_{corr} = \delta_k^H \tilde{S}_d^H y, \qquad (49)$$

noting that correlator $x_{corr}$ is a complex scalar. The multiplication by signal convolution matrix $\tilde{S}_d^H$ performs the operation of correlation on receive data vector y with the transmitted signal vector s. The multiplication by $\delta_k^H$ sifts out the response of the correlator to a target 510 at range cell k. The output of the MTD Doppler filter matched to the target Doppler is:

$$z_{corr+MTD} = \alpha u^H \begin{bmatrix} x_{corr_1} \\ \vdots \\ x_{corr_M} \end{bmatrix}, \qquad (50)$$

where $x_{corr_i}$ is the output of the correlator from the $i^{th}$ pulse received.

Subsection (a)—Correlator and Moving Target Detector: The correlator response to a point target for the $i^{th}$ pulse is:

$$x_{corr_t} = \delta_k^H \tilde{S}_d^H y_{T_i} = u_i \alpha \delta_k^H \tilde{S}_d^H \tilde{S}_d \delta_k. \qquad (51)$$

Using eqn. (50), the received power due to the target 510 is:

$$|z_{corr+MTD}|^2 = |\alpha|^2 \left| u^H \begin{bmatrix} u_0 \delta_k^H \tilde{S}_d^H \tilde{S}_d \delta_k \\ \vdots \\ u_{M-1} \delta_k^H \tilde{S}_d^H \tilde{S}_d \delta_k \end{bmatrix} \right|^2. \qquad (52)$$

On a per pulse basis the response of the correlator to the interference is:

$$x_{corr_t} = \delta_k^H \tilde{S}_d^H (\tilde{S} c((i-1)T_i) + n). \qquad (53)$$

Based on eqn. (50), the output of the Correlator+MTD to the interference is:

$$z_{corr+MTD} = u^H \left( (\delta_k^H \tilde{S}_d^H) \begin{bmatrix} \tilde{S}c(0) + n \\ \vdots \\ \tilde{S}c((M-1)T_i) + n \end{bmatrix} \right), \qquad (54)$$

where the multiplication by $\delta_k^H \tilde{S}_d^H$ is understood to be done on every element of the of the matrix, where each element is in the form of $\tilde{S}c((M\ 1)T_i)|n$.

The power of the interference in the output of Correlator+MTD is:

$$E\{|z_{corr+MTD}|^2\} = \qquad (55)$$

$$E\left\{ u^H \left( (\delta_k^H \tilde{S}_d^H) \begin{bmatrix} \tilde{S}c(0) + n \\ \vdots \\ \tilde{S}c((M-1)T_i) + n \end{bmatrix} \begin{bmatrix} \tilde{S}c(0) + n \\ \vdots \\ \tilde{S}c(M-1)T_i + n \end{bmatrix}^H \right) (\tilde{S}_d \delta_k) u \right\},$$

which can be factored as:

$$E\{|z_{corr+MTD}|^2\} = \qquad (56)$$

$$u^H \left( (\delta_k^H \tilde{S}_d^H) E\left\{ \begin{bmatrix} \tilde{S}c(0) + n \\ \vdots \\ \tilde{S}c((M-1)T_i) + n \end{bmatrix} \begin{bmatrix} \tilde{S}c(0) + n \\ \vdots \\ \tilde{S}c(M-1)T_i + n \end{bmatrix}^H \right\} (\tilde{S}_d \delta_k) \right) u.$$

By applying eqns. (26) through (32), one has complex voltage output:

$$|z_{corr+MTD}|^2 = u^H ((\delta_k^H \tilde{S}_d^H) R_I (\tilde{S}_d \delta_k)) u. \qquad (57)$$

If the clutter 120 has the same Doppler spectrum for all range cells, then eqn. (33) can be applied giving:

$$|z_{corr+MTD}|^2 = u^H ((\delta_k^H \tilde{S}_d^H) M_c \beta \tilde{S} R_c \tilde{S}^H + \sigma_n^2 I)(\tilde{S}_d \delta_k)) u. \qquad (58)$$

Moreover, eqn. (58) can be rewritten as:

$$|z_{corr+MTD}|^2 = u^H ((M_c \beta (\delta_k^H \tilde{S}_d^H \tilde{S} R_c \tilde{S}^H \tilde{S}_d \delta_k)) + \sigma_n^2 I \beta \delta_k^H \tilde{S}_d^H \tilde{S}_d \delta_k) u, \qquad (59)$$

where I is the identity matrix of size M×M.

Applying eqns. (52) and (59), the SIR for the Correlator+MTD can be determined as:

$$SIR_{corr+MTD} = \frac{|\alpha|^2 \left| u^H \begin{bmatrix} u_0 \delta_k^H \tilde{S}_d^H \tilde{S}_d \delta_k \\ \vdots \\ u_{M-1} \delta_k^H \tilde{S}_d^H \tilde{S}_d \delta_k \end{bmatrix} \right|^2}{u^H \left( (M_c \otimes (\delta_k^H \tilde{S}_d^H \tilde{S} R_c \tilde{S}^H \tilde{S}_d \delta_k)) + \sigma_n^2 I \otimes \delta_k^H \tilde{S}_d^H \tilde{S}_d \delta_k \right) u}. \qquad (60)$$

Next the Correlator+MTD is evaluated for performance against fast moving targets, i.e., those subject to range migration. First the SIR for the Correlator+MTD when the detector 590 is not compensating for the range migration of the targets. Under this assumption, the target model is:

$$y_{T_i} = \alpha u_i \tilde{R}_m(m) \tilde{S}_d \delta_k. \qquad (61)$$

Based on this the output of the Correlator+MTD for a point target is:

$$z_{corr+MTD} = \alpha u^H \begin{bmatrix} u_0 \delta_k^H \tilde{S}_d^H \tilde{R}_m(0) \tilde{S}_d \delta_k \\ \vdots \\ u_{M-1} \delta_k^H \tilde{S}_d^H \tilde{R}_m(M-1) \tilde{S}_d \delta_k \end{bmatrix}. \qquad (62)$$

This in turn gives the power output of the detector 590 due to the target 510 as:

$$|z_{corr+MTD}|^2 = |\alpha|^2 \left| u^H \begin{bmatrix} u_0 \delta_k^H \tilde{S}_d^H \tilde{R}_m(0) \tilde{S}_d \delta_k \\ \vdots \\ u_{M-1} \delta_k^H \tilde{S}_d^H \tilde{R}_m(M-1) \tilde{S}_d \delta_k \end{bmatrix} \right|^2. \qquad (63)$$

Because there is no range migration compensation the interference power output of the Correlator+MTD detector is the same as for the slow target case above. Therefore, the SIR for this case is:

$$SIR_{corr+MTD} = \frac{|\alpha|^2 \left| u^H \begin{bmatrix} u_0 \delta_k^H \tilde{S}_d^H \tilde{R}_m(0) \tilde{S}_d \delta_k \\ \vdots \\ u_{M-1} \delta_k^H \tilde{S}_d^H \tilde{R}_m(M-1) \tilde{S}_d \delta_k \end{bmatrix} \right|^2}{u^H \left( (M_c \otimes (\delta_k^H \tilde{S}_d^H \tilde{S} R_c \tilde{S}^H \tilde{S}_d \delta_k)) + \sigma_n^2 I \otimes \delta_k^H \tilde{S}_d^H \tilde{S}_d \delta_k \right) u}. \quad (64)$$

One can expect that as range migration comes more into play that the Correlator+MTD is suboptimal therefore degrading the output SIR. This is what eqn. (64) enables one to calculate. However, it is straightforward to modify the Correlator+MTD to account for range migration. Under this condition the Correlator+MTD retains it optimality when used in AWGN alone. In order to determine its performance, the SIR for this case will be derived. The output of the correlator is:

$$corr_i = \delta_k^H \tilde{S}_d^H \alpha u_i \tilde{R}'_m(m) \tilde{R}_m(m) \tilde{S}_d \delta_k, \quad (65)$$

where $\tilde{R}'_m(m)$ is defined the same as $\tilde{R}_m(m)$ except $\Delta T_s = 2(R(0) - R(mT_i + kT_s))/c$. Thus multiplication by $\tilde{R}'_m(m)$ compensates for the target range migration producing $\tilde{R}'_m(m)\tilde{R}_m(m) \approx I$. The output of the Correlator+MTD due to the target will be the same as in the slow target case under the assumption that the range migration has been perfectly compensated. The output of the detector 590 due to interference changes because the range migration compensation affects the clutter 120.

Thus the complex voltage output of the detector 590 due to interference is:

$$z_{corr+MTD} = u^H \left( \begin{bmatrix} \delta_k^H \tilde{S}_d^H \tilde{R}'_m(0) \tilde{S} c(0) \\ \vdots \\ \delta_k^H \tilde{S}_d^H \tilde{R}'_m(M-1) \tilde{S} c((M-1)T_i) \end{bmatrix} + n \right). \quad (66)$$

This can be rewritten as:

$$z_{corr+MTD} = u^H (\delta_k^H \tilde{S}_d^H) \left( \begin{bmatrix} \tilde{R}'_m(0) \tilde{S} c(0) \\ \vdots \\ \tilde{R}'_m(M-1) \tilde{S} c((M-1)T_i) \end{bmatrix} + n \right), \quad (67)$$

where one understands that $\delta_k^H \tilde{S}_d^H$ multiplies each element in the vector where each element is in the form of $\tilde{R}'_m(i-1)c((i-1)T_i)$. From this, the output power due to interference will be:

$$E\{|z_{corr+MTD}|^2\} = \quad (68)$$

$$u^H (\delta_k^H \tilde{S}_d^H) E \left\{ \left( \begin{bmatrix} \tilde{R}'_m(0) \tilde{S} c(0) \\ \vdots \\ \tilde{R}'_m(M-1) \tilde{S} c((M-1)T_i) \end{bmatrix} + n \right) \right.$$

$$\left. \left( \begin{bmatrix} \tilde{R}'_m(0) \tilde{S} c(0) \\ \vdots \\ \tilde{R}'_m(M-1) \tilde{S} c((M-1)T_i) \end{bmatrix} + n \right)^H \right\} (\tilde{S}_d \delta_k) u.$$

To perform the manipulations to get eqn. (71) in a more convenient form, one can simplify notations as follows, $c'(i) = c(iT_i)$, where $0 \le i \le M-1$ and defining $R_{zc}$ as:

$$R_{zc} = E \left\{ \begin{bmatrix} \tilde{R}'_m(0) \tilde{S} c'(0) \\ \vdots \\ \tilde{R}'_m(M-1) \tilde{S} c'(M-1) \end{bmatrix} \begin{bmatrix} \tilde{R}'_m(0) \tilde{S} c'(0) \\ \vdots \\ \tilde{R}'_m(M-1) \tilde{S} c'(M-1) \end{bmatrix}^H \right\}. \quad (69)$$

Based on this, the interference power can be written as:

$$E\{|_{corr+MTD}|^2\} = u^H (\delta_k^H \tilde{S}_d^H)(R_{zc} + \sigma_n I)(\tilde{S}_d \delta_k) u. \quad (70)$$

Based on this, eqn. (69) can be factored as:

$$R_{zc} = \begin{bmatrix} a_{1,1} & a_{1,2} \\ & \ddots & \\ a_{2,1} & & a_{2,2} \end{bmatrix}, \quad (71)$$

where $$\begin{aligned} a_{1,1} &= \tilde{R}'_m(0) \tilde{S} E\{c'(0) c'^H(0)\} \tilde{S}^H \tilde{R}'^H_m(0), \\ a_{2,1} &= \tilde{R}'_m(M-1) \tilde{S} E\{c'(M-1) c'^H(0)\} \tilde{S}^H \tilde{R}'^H_m(0), \\ a_{1,2} &= \tilde{R}'_m(0) \tilde{S} E\{c'(0) c'^H(M-1)\} \tilde{S}^H \tilde{R}'^H_m(M-1), \\ a_{2,2} &= \tilde{R}'_m(M-1) \tilde{S} E\{c'(M-1) c'^H(M-1)\} \tilde{S}^H \tilde{R}'^H_m(M-1), \end{aligned} \quad (72)$$

and eqn. (28) can be used to determine $E\{c'(j)c'^H(k)\}$.

Under the assumption that all range cells have the same Doppler spectrum $R_{zc}$ can be simplified to:

$$R_{zc} = \begin{bmatrix} \rho_{1,1} \tilde{R}'_m(0) \tilde{S} R_c \tilde{S}^H R'^H_m(0) & \rho_{1,M} \tilde{R}'_m(0) \tilde{S} R_c \tilde{S}^H R'^H_m(M-1) \\ & \ddots & \\ \rho_{M,1} \tilde{R}'_m(M-1) \tilde{S} R_c \tilde{S}^H R'^H_m(0) & \rho_{M,M} \tilde{R}'_m(M-1) \tilde{S} R_c \tilde{S}^H R'^H_m(M-1) \end{bmatrix}. \quad (73)$$

Using eqns. (57), (74) and (73), the SIR for the Correlator+ MTD matched to the fast target can be written as:

$$SIR_{corr+MTD} = \frac{|\alpha|^2 A_1}{u^H(A_2 + \sigma_n^2 I \otimes \delta_k^H \tilde{S}_d^H \tilde{S}_d)u}, \qquad (74)$$

where arrays:

$$A_1 = \left| u^H \begin{bmatrix} u_1 \delta_k^H \tilde{S}_d^H \tilde{R}'_m(0) \tilde{R}_m(0) \tilde{S}_d \delta_k \\ \vdots \\ u_{M-1} \delta_k^H \tilde{S}_d^H \tilde{R}'_m(M-1) \tilde{R}_m(M-1) \tilde{S}_d \delta_k \end{bmatrix} \right|^2 \qquad (75)$$

and $$A_2 = \begin{bmatrix} \rho_{1,1} \delta_k^H \tilde{S}_d^H \tilde{R}'_m(0) \tilde{S} \tilde{R}_c \tilde{S}^H \tilde{R}'^H_m(0) \tilde{S}_d \delta_k & \rho_{1,M} \delta_k^H \tilde{S}_d^H \tilde{R}'_m(0) \tilde{S} \tilde{R}_c \tilde{S}^H \tilde{R}'^H_m(M-1) \tilde{S}_d \delta_k \\ & \ddots \\ \rho_{M,1} \delta_k^H \tilde{S}_d^H \tilde{R}'_m(M-1) \tilde{S} \tilde{R}_c \tilde{S}^H \tilde{R}'^H_m(0) \tilde{S}_d \delta_k & \rho_{M,M} \delta_k^H \tilde{S}_d^H \tilde{R}'_m(M-1) \tilde{S} \tilde{R}_c \tilde{S}^H \tilde{R}'^H_m(M-1) \tilde{S}_d \delta_k \end{bmatrix}$$

for is pair of array coefficients.

Subsection (b)—SIR for Optimum Detector for Slow Moving Target: The detector 590 for the slow moving (no range migration) target 110 is defined in eqn. (34). This detector is optimum for the assumptions defined including no range migration of the target and that the interference matrix is known á priori. Here, the output SIR of the detector 590 is determined. This enables this detector to be compared to other detectors, as well as the assessment of performance when the parameters of the signal and interference processes are not exactly known. In this development, the target is assumed to be a point target. Under this assumption, the test statistic from the detector 590 is:

$$z_{Slow} = u^H \beta (\delta_k^H \tilde{S}_d^H) R_I^{-1} Y. \qquad (76)$$

From the target model eqn. (24) the received data due to a point target $Y_T$ is:

$$Y_T = \alpha u \beta \tilde{S}_d \delta_k. \qquad (77)$$

The signal power level at the output of the detector 590 is:

$$|z_{Slow}|^2 = |\alpha|^2 \left| u^H \otimes (\delta_k^H \tilde{S}_d^H) R_I^{-1} u \otimes \tilde{S}_d \delta_k \right|^2. \qquad (78)$$

The output of the detector 590 due to interference is:

$$z_{Slow} = u^H \otimes (\delta_k^H \tilde{S}_d^H) R_I^{-1} (Y_c + Y_n). \qquad (79)$$

The power from the interference is determined as:

$$E\{z_{Slow_j} z^*_{Slow_j}\} = \qquad (80)$$
$$E\{u^H \otimes (\delta_k^H \tilde{S}_d^H) R_I^{-1} (Y_c + Y_n)(Y_c + Y_n)^H R_I^{-1} u \otimes (\tilde{S}_d \delta_k)\},$$

which can be factored into:

$$E\{z_{Slow_j} z^*_{Slow_j}\} = \qquad (81)$$
$$u^H \otimes (\delta_k^H \tilde{S}_d^H) R_I^{-1} E\{(Y_c + Y_n)(Y_c + Y_n)^*\} R_I^{-1} u \otimes (\tilde{S}_d \delta_k).$$

Recognizing that the interference correlation matrix:

$$R_I = E\{(Y_c + Y_n)(Y_c + Y_n)^*\}, \qquad (82)$$

enables simplifying eqn. (62) to:

$$E\{z_{Slow_j} z^*_{Slow_j}\} = u^H \otimes (\delta_k^H \tilde{S}_d^H) R_I^{-1} u \otimes (\tilde{S}_d \delta_k). \qquad (83)$$

This gives the SIR for the slow detector as:

$$SIR_{corr+MTD} = \frac{|\alpha|^2 \left| u^H \otimes (\delta_k^H \tilde{S}_d^H) R_I^{-1} u \otimes (\tilde{S}_d \delta_k) \right|^2}{u^H \otimes (\delta_k^H \tilde{S}_d^H) R_I^{-1} u \otimes (\tilde{S}_d \delta_k)}. \qquad (84)$$

which can be simplified to:

$$SIR_{corr+MTD} = |\alpha|^2 \left| u^H \otimes (\delta_k^H \tilde{S}_d^H) R_I^{-1} u \otimes (\tilde{S}_d \delta_k) \right|. \qquad (85)$$

Next the SIR for a mismatched detector will be determined. To begin the target pulse-to-pulse phase change vector used by the detector 590 is designated $u_D$ while the detector's interference correlation matrix is similar to eqn. (33):

$$R_{I_a} = M_{c_D} \otimes \tilde{S} R_{c_D} \tilde{S}^H + \sigma_{n_D}^2 I, \qquad (86)$$

where the subscript D denotes the detector's assumed parameter. In a similar manner target's actual pulse-to-pulse phase change vector is designated $u_D$ and the actual interference correlation matrix is:

$$R_{I_d} = M_{c_d} \otimes \tilde{S} R_{c_d} \tilde{S}^H + \sigma_{n_d}^2 I. \tag{87}$$

The subscript A denoting the actual value of the parameter. Based on eqn. (76), the detector test statistic becomes:

$$z_{Slow} = \tag{88}$$
$$u_D^H \otimes (\delta_k^H \tilde{S}_d^H)(M_{c_D} \otimes \tilde{S} R_{c_D} \tilde{S}^H + \sigma_{n_D}^2 I)^{-1} Y = u_D^H \otimes (\delta_k^H \tilde{S}_d^H) R_{I_D}^{-1} Y.$$

The input to the detector 590 from the target 510 is:

$$Y_T = \alpha u_A \otimes (\tilde{S}_d \delta_k). \tag{89}$$

Applying this to eqn. (76) gives the mismatched detector's response to the target 510 as:

$$z_{Slow_r} = u_D^H \otimes (\delta_k^H \tilde{S}_d^H) R_{I_p}^{-1} \alpha u_A \otimes (\tilde{S}_d \delta_k). \tag{90}$$

The power due to the target in the mismatched detector is:

$$|z_{Slow_r}|^2 = |\alpha|^2 |u_D^H \otimes (\delta_k^H \tilde{S}_d^H) R_{I_b}^{-1} u_A \otimes (\tilde{S}_d \delta_k)|^2. \tag{91}$$

In a similar manner, the interference induced in the mismatched slow detector can be shown to be:

$$E\{|z_{Slow_r}|^2\} = u_D^H \otimes (\delta_k^H \tilde{S}_d^H) R_{I_D}^{-1} R_{I_A} R_{I_D}^{-1} u_D \otimes (\tilde{S}_d \delta_k). \tag{92}$$

This give the SIR for the mismatched detector as:

$$SIR_{corr+MTD} = \frac{|\alpha|^2 |u_D^H \otimes (\delta_k^H \tilde{S}_d^H) R_{I_o}^{-1} u_A \otimes (\tilde{S}_d \delta_k)|^2}{u_D^H \otimes (\delta_k^H \tilde{S}_d^H) R_{I_D}^{-1} u_D \otimes (\tilde{S}_d \delta_k)}. \tag{93}$$

Subsection (c)—SIR for Optimum Detector for Fast Moving Target: The detector 590 is presented in eqn. (48). Here, the target will be assumed to be a point target. The test statistic is computed as:

$$z_{Fast} = \begin{bmatrix} u_0 \tilde{R}_m(0) \tilde{S}_d(0) \delta_k \\ u_1 \tilde{R}_m(1) \tilde{S}_d(1) \delta_k \\ \vdots \\ u_{M-1} \tilde{R}_m(M-1) \tilde{S}_d(M-1) \delta_k \end{bmatrix}^H R_I^{-1} Y. \tag{94}$$

From the target model eqn. (44) the power output of the detector 590 due to the target 510 is:

$$|z_{Fast_I}|^2 = |\alpha|^2 \left| \begin{bmatrix} u_0 \tilde{R}_m(0) \tilde{S}_d(0) \delta_k \\ u_1 \tilde{R}_m(1) \tilde{S}_d(1) \delta_k \\ \vdots \\ u_{M-1} \tilde{R}_m(M-1) \tilde{S}_d(M-1) \delta_k \end{bmatrix}^H R_I^{-1} \begin{bmatrix} u_0 \tilde{R}_m(0) \tilde{S}_d(0) \delta_k \\ u_1 \tilde{R}_m(1) \tilde{S}_d(1) \delta_k \\ \vdots \\ u_{M-1} \tilde{R}_m(M-1) \tilde{S}_d(M-1) \delta_k \end{bmatrix} \right|^2. \tag{95}$$

The output of the detector 590 due to the interference is:

$$z_{Fast_I} = \begin{bmatrix} u_0 \tilde{R}_m(0) \tilde{S}_d(0) \delta_k \\ u_1 \tilde{R}_m(1) \tilde{S}_d(1) \delta_k \\ \vdots \\ u_{M-1} \tilde{R}_m(M-1) \tilde{S}_d(M-1) \delta_k \end{bmatrix}^H R_I^{-1} Y_I. \tag{96}$$

The power of the interference is found by taking the expectation of $|z_{Fast_I}|^2$ giving:

$$|z_{Fast_I}|^2 = E \left\{ \begin{bmatrix} u_0 \tilde{R}_m(0) \tilde{S}_d(0) \delta_k \\ u_1 \tilde{R}_m(1) \tilde{S}_d(1) \delta_k \\ \vdots \\ u_{M-1} \tilde{R}_m(M-1) \tilde{S}_d(M-1) \delta_k \end{bmatrix}^H R_I^{-1} Y_I Y_I R_I^{-1} \begin{bmatrix} u_0 \tilde{R}_m(0) \tilde{S}_d(0) \delta_k \\ u_1 \tilde{R}_m(1) \tilde{S}_d(1) \delta_k \\ \vdots \\ u_{M-1} \tilde{R}_m(M-1) \tilde{S}_d(M-1) \delta_k \end{bmatrix} \right\}. \tag{97}$$

This can be factored to produce:

$$|z_{Fast_I}|^2 = \begin{bmatrix} u_0 \tilde{R}_m(0)\tilde{S}_d(0)\delta_k \\ u_1 \tilde{R}_m(1)\tilde{S}_d(1)\delta_k \\ \vdots \\ u_{M-1} \tilde{R}_m(M-1)\tilde{S}_d(M-1)\delta_k \end{bmatrix}^H R_I^{-1} E\{Y_I Y_I^H\} R_I^{-1} \begin{bmatrix} u_0 \tilde{R}_m(0)\tilde{S}_d(0)\delta_k \\ u_1 \tilde{R}_m(1)\tilde{S}_d(1)\delta_k \\ \vdots \\ u_{M-1} \tilde{R}_m(M-1)\tilde{S}_d(M-1)\delta_k \end{bmatrix}. \quad (98)$$

which can be simplified to:

$$|z_{Fast_I}|^2 = \begin{bmatrix} u_0 \tilde{R}_m(0)\tilde{S}_d(0)\delta_k \\ u_1 \tilde{R}_m(1)\tilde{S}_d(1)\delta_k \\ \vdots \\ u_{M-1} \tilde{R}_m(M-1)\tilde{S}_d(M-1)\delta_k \end{bmatrix}^H R_I^{-1} \begin{bmatrix} u_0 \tilde{R}_m(0)\tilde{S}_d(0)\delta_k \\ u_1 \tilde{R}_m(1)\tilde{S}_d(1)\delta_k \\ \vdots \\ u_{M-1} \tilde{R}_m(M-1)\tilde{S}_d(M-1)\delta_k \end{bmatrix}. \quad (99)$$

Combining eqns. (95) and (99) enables computing the SIR for the Fast detector as:

$$SIR_{Fast}|\alpha|^2 = \begin{bmatrix} u_0 \tilde{R}_m(0)\tilde{S}_d(0)\delta_k \\ u_1 \tilde{R}_m(1)\tilde{S}_d(1)\delta_k \\ \vdots \\ u_{M-1} \tilde{R}_m(M-1)\tilde{S}_d(M-1)\delta_k \end{bmatrix}^H R_I^{-1} \begin{bmatrix} u_0 \tilde{R}_m(0)\tilde{S}_d(0)\delta_k \\ u_1 \tilde{R}_m(1)\tilde{S}_d(1)\delta_k \\ \vdots \\ u_{M-1} \tilde{R}_m(M-1)\tilde{S}_d(M-1)\delta_k \end{bmatrix}. \quad (100)$$

Next the SIR for a mismatched detector will be determined. To begin, $u_D$ designates the target pulse-to-pulse phase change vector used by the detector 590, $\tilde{R}_{m_D}$ is the target range migration matrix used by the detector 590, and $R_{I_D}$ is the detector's interference correlation matrix as defined in eqn. (86). The subscript D denotes the detector's assumed parameter. In a similar manner, $u_A$ designates the target's actual pulse-to-pulse phase change vector, $\tilde{R}_{m_A}$ is the actual target range migration matrix, and $R_{I_A}$ is the actual interference correlation matrix as defined in eqn. (87). The subscript A indicates the actual value.

The power output of the mismatched filter due to the target 510 is:

$$|z_{Fast_I}|^2 = |\alpha|^2 \begin{bmatrix} u_{D_0} \tilde{R}_{m_D}(0)\tilde{S}_d(0)\delta_k \\ u_{D_1} \tilde{R}_{m_D}(1)\tilde{S}_d(1)\delta_k \\ \vdots \\ u_{D_{M-1}} \tilde{R}_{m_D}(M-1)\tilde{S}_d(M-1)\delta_k \end{bmatrix}^H R_{I_D}^{-1} \begin{bmatrix} u_{A_0} \tilde{R}_{m_A}(0)\tilde{S}_d(0)\delta_k \\ u_{A_1} \tilde{R}_{m_A}(1)\tilde{S}_d(1)\delta_k \\ \vdots \\ u_{A_{M-1}} \tilde{R}_{m_A}(M-1)\tilde{S}_d(M-1)\delta_k \end{bmatrix}. \quad (101)$$

To determine the mismatched filter interference power eqn. (98) can be rewritten as:

$$|z_{Fast_I}|^2 = \begin{bmatrix} u_{D_0} \tilde{R}_{m_D}(0)\tilde{S}_d(0)\delta_k \\ u_{D_1} \tilde{R}_{m_D}(1)\tilde{S}_d(1)\delta_k \\ \vdots \\ u_{D_{M-1}} \tilde{R}_{m_D}(M-1)\tilde{S}_d(M-1)\delta_k \end{bmatrix}^H R_{I_D}^{-1} E\{Y_I Y_I^H\} R_{I_D}^{-1} \begin{bmatrix} u_{D_0} \tilde{R}_{m_D}(0)\tilde{S}_d(0)\delta_k \\ u_{D_1} \tilde{R}_{m_D}(1)\tilde{S}_d(1)\delta_k \\ \vdots \\ u_{D_{M-1}} \tilde{R}_{m_D}(M-1)\tilde{S}_d(M-1)\delta_k \end{bmatrix}. \quad (102)$$

which can be simplified to:

$$|z_{Fast_I}|^2 = \begin{bmatrix} u_{D_0}\tilde{R}_{m_D}(0)\tilde{S}_d(0)\delta_k \\ u_{D_1}\tilde{R}_{m_D}(1)\tilde{S}_d(1)\delta_k \\ \vdots \\ u_{D_{M-1}}\tilde{R}_{m_D}(M-1)\tilde{S}_d(M-1)\delta_k \end{bmatrix}^H \quad (103)$$

$$R_{I_D}^{-1} R_{I_A} R_{I_D}^{-1} \begin{bmatrix} u_{A_0}\tilde{R}_{m_d}(0)\tilde{S}_d(0)\delta_k \\ u_{A_1}\tilde{R}_{m_d}(1)\tilde{S}_d(1)\delta_k \\ \vdots \\ u_{A_{M-1}}\tilde{R}_{m_d}(M-1)\tilde{S}_d(M-1)\delta_k \end{bmatrix}.$$

The SIR for the Fast mismatched filter is obtained by dividing eqn. (101) by eqn. (103) to produce:

$$SIR_{Fast_{mismatched}} = \frac{|\alpha|^2 \left\| \begin{bmatrix} u_{D_0}\tilde{R}_{m_D}(0)\tilde{S}_d(0)\delta_k \\ u_{D_1}\tilde{R}_{m_D}(1)\tilde{S}_d(1)\delta_k \\ \vdots \\ u_{D_{M-1}}\tilde{R}_{m_D}(M-1)\tilde{S}_d(M-1)\delta_k \end{bmatrix}^H R_{I_D}^{-1} \begin{bmatrix} u_{A_0}\tilde{R}_{m_s}(0)\tilde{S}_d(0)\delta_k \\ u_{A_1}\tilde{R}_{m_s}(1)\tilde{S}_d(1)\delta_k \\ \vdots \\ u_{A_{M-1}}\tilde{R}_{m_s}(M-1)\tilde{S}_d(M-1)\delta_k \end{bmatrix} \right\|^2}{\begin{bmatrix} u_{D_0}\tilde{R}_{m_D}(0)\tilde{S}_d(0)\delta_k \\ u_{D_1}\tilde{R}_{m_D}(1)\tilde{S}_d(1)\delta_k \\ \vdots \\ u_{D_{M-1}}\tilde{R}_{m_D}(M-1)\tilde{S}_d(M-1)\delta_k \end{bmatrix}^H R_{I_D}^{-1} R_{I_A} R_{I_D}^{-1} \begin{bmatrix} u_{D_0}\tilde{R}_{m_D}(0)\tilde{S}_d(0)\delta_k \\ u_{D_1}\tilde{R}_{m_D}(1)\tilde{S}_d(1)\delta_k \\ \vdots \\ u_{D_{M-1}}\tilde{R}_{m_D}(M-1)\tilde{S}_d(M-1)\delta_k \end{bmatrix}}, \quad (104)$$

Subsection (d)—Detectors for Multiple Non-Identical Pulses: Here, the optimum detector 590 for the case that multiple pulses are transmitted coherently and it is desired to maximize detection probability for a given probability of false alarm in the presence of clutter 120. Normally radars 130 transmit identical pulses. However, recent literature has shown how that the pulses may be different subject to constraints. This approach removes these constraints while producing an optimum detector (subject to the previously imposed assumptions).

In this development, one can assume that range migration can be ignored, i.e., the eqn. (1) rate inequality, that the target acceleration can be ignored and the target is a point target, for simplicity of notation. Note that including range migration, target acceleration and finite extent into this formulation is straightforward using the previous developed approach. Each pulse transmitted is $s_i$ which is a vector containing the baseband samples of the $i^{th}$ pulse that is transmitted. This produces the respective signal convolution matrices as:

$$\tilde{S}_i = \begin{bmatrix} 0 & \cdots & 0 & s_i^t \\ 0 & \cdots & s_i^t & 0 \\ & \ddots & & \\ s_i^t & 0 & \cdots & 0 \end{bmatrix}. \quad (105)$$

The received data due to a point target are then matrix:

$$Y_T = \alpha \begin{bmatrix} u_0 \tilde{S}_{1,d}\delta_k \\ u_1 \tilde{S}_{2,d}\delta_k \\ \vdots \\ u_{M-1}\tilde{S}_{M,d}\delta_k \end{bmatrix}. \quad (106)$$

In a similar manner, the received data due to clutter 120 will be similar to eqn. (25):

$$Y_c = \begin{bmatrix} \tilde{S}_1 c(0) \\ \tilde{S}_2 c((i-1)T_i) \\ \vdots \\ \tilde{S}_M c((M-1)T_i) \end{bmatrix}. \quad (107)$$

From this the clutter correlation can be determined as:

$$R_{y_c} = \quad (108)$$

$$E\left\{ \begin{bmatrix} \tilde{S}_1 c(0) \\ \tilde{S}_2 c(T_i) \\ \vdots \\ \tilde{S}_M c((M-1)T_i) \end{bmatrix} \begin{bmatrix} c^H(0)\tilde{S}_1^H & c^H(T_i)\tilde{S}_2^H & \cdots & c^H((M-1)T_i)\tilde{S}_M^H \end{bmatrix} \right\}.$$

Under the assumption that the clutter 120 has the same Doppler spectrum the clutter correlation matrix can be written similar to eqn. (30) as:

$$R_{y_c} = \begin{bmatrix} \rho_{1,1}\tilde{S}R_c\tilde{S}^H & & \rho_{1,M}\tilde{S}R_c\tilde{S}^H \\ & \ddots & \\ \rho_{M,1}\tilde{S}R_c\tilde{S}^H & & \rho_{M,M}\tilde{S}R_c\tilde{S}^H \end{bmatrix}. \quad (109)$$

Clearly the noise correlation matrix is unchanged. Therefore, it is straightforward to write the optimum detector 590 for non-identical pulses as:

$$\left\| \begin{bmatrix} u_0 \tilde{S}_{1,d}\delta_k \\ u_1 \tilde{S}_{2,d}\delta_k \\ \vdots \\ u_{M-1}\tilde{S}_{M,d}\delta_k \end{bmatrix}^H R_I^{-1} Y \right\| \underset{H_0}{\overset{H_1}{\gtrless}} \eta, \quad (110)$$

where the interference correlation matrix in similarity to eqn. (37) is:

$$R_I = \begin{bmatrix} \begin{bmatrix} \rho_{1,1}\tilde{S}_1 R_c \tilde{S}_1^H & & \tilde{S}\rho_{1,M}\tilde{S}_1 R_c \tilde{S}_M^H \\ & \ddots & \\ \rho_{M,1}\tilde{S}_M R_c \tilde{S}_1^H & & \rho_{M,M}\tilde{S}_M R_c \tilde{S}_M^H \end{bmatrix} + \sigma_n^2 I \end{bmatrix}. \quad (111)$$

Subsection (e)—SIR for Non-Identical Pulse Detector: The power output of the detector 590 due to the signal is:

$$|z_r|^2 = |\alpha|^2 \begin{bmatrix} \begin{bmatrix} u_0 \tilde{S}_{1,d}\delta_k \\ u_0 \tilde{S}_{2,d}\delta_k \\ \vdots \\ u_{M-1}\tilde{S}_{M,d}\delta_k \end{bmatrix}^H R_I^{-1} \begin{bmatrix} u_0 \tilde{S}_{1,d}\delta_k \\ u_0 \tilde{S}_{2,d}\delta_k \\ \vdots \\ u_0 \tilde{S}_{M,d}\delta_k \end{bmatrix} \end{bmatrix}^2. \quad (112)$$

The power output of the of the detector 590 due to the interference is:

$$|z_I|^2 = \begin{bmatrix} u_0 \tilde{S}_{1,d}\delta_k \\ u_1 \tilde{S}_{2,d}\delta_k \\ \vdots \\ u_{M-1}\tilde{S}_{M,d}\delta_k \end{bmatrix}^H R_I^{-1} \begin{bmatrix} u_0 \tilde{S}_{1,d}\delta_k \\ u_1 \tilde{S}_{2,d}\delta_k \\ \vdots \\ u_{M-1}\tilde{S}_{M,d}\delta_k \end{bmatrix}. \quad (113)$$

This produces the SIR for the Non-Identical pulse detector as:

$$SIR_{NIP} = \begin{bmatrix} u_0 \tilde{S}_{1,d}\delta_k \\ u_1 \tilde{S}_{2,d}\delta_k \\ \vdots \\ u_{M-1}\tilde{S}_{M,d}\delta_k \end{bmatrix}^H R_I^{-1} \begin{bmatrix} u_0 \tilde{S}_{1,d}\delta_k \\ u_1 \tilde{S}_{2,d}\delta_k \\ \vdots \\ u_{M-1}\tilde{S}_{M,d}\delta_k \end{bmatrix}. \quad (114)$$

Next the mismatched detector 590 SIR is determined. The design pulse-to-pulse phase change vector is $u_D$, the actual pulse-to-pulse phase change vector is $u_A$. The design interference correlation matrix is:

$$R_{I_D} = \begin{bmatrix} \rho_{D,1,1}\tilde{S}_1 R_{c_D}\tilde{S}_1^H & & \rho_{D,1,M}\tilde{S}_1 R_{c_D}\tilde{S}_M^H \\ & \ddots & \\ \rho_{D,M,1}\tilde{S}_M R_{c_D}\tilde{S}_1^H & & \rho_{D,M,M}\tilde{S}_M R_{c_D}\tilde{S}_M^H \end{bmatrix} + \sigma_{n_D}I. \quad (115)$$

Similarly, the actual interference correlation matrix is:

$$R_{I_A} = \begin{bmatrix} \rho_{A,1,1}\tilde{S}_1 R_{c_A}\tilde{S}_1^H & & \rho_{A,1,M}\tilde{S}_1 R_{c_A}\tilde{S}_M^H \\ & \ddots & \\ \rho_{A,M,1}\tilde{S}_M R_{c_A}\tilde{S}_1^H & & \rho_{A,M,M}\tilde{S}_M R_{c_A}\tilde{S}_M^H \end{bmatrix} + \sigma_{n_i}I. \quad (116)$$

From this, the SIR for the mismatched NIP detector 590 can be determined as:

$$SIR_{NIP_{mismatched}} = \frac{|\alpha|^2 \begin{bmatrix} \begin{bmatrix} u_{D_0}\tilde{S}_{1,d}\delta_k \\ u_{D_1}\tilde{S}_{1,d}\delta_k \\ \vdots \\ u_{D_{M-1}}\tilde{S}_{1,d}\delta_k \end{bmatrix}^H R_{I_D} \begin{bmatrix} u_{A_0}\tilde{S}_{1,d}\delta_k \\ u_{A_1}\tilde{S}_{1,d}\delta_k \\ \vdots \\ u_{A_{M-1}}\tilde{S}_{1,d}\delta_k \end{bmatrix} \end{bmatrix}^2}{\begin{bmatrix} u_{D_0}\tilde{S}_{1,d}\delta_k \\ u_{D_1}\tilde{S}_{1,d}\delta_k \\ \vdots \\ u_{D_{M-1}}\tilde{S}_{1,d}\delta_k \end{bmatrix}^H R_{I_D}^{-1} R_{I_S} R_{I_A}^{-1} \begin{bmatrix} u_{D_0}\tilde{S}_{1,d}\delta_k \\ u_{D_1}\tilde{S}_{1,d}\delta_k \\ \vdots \\ u_{D_{M-1}}\tilde{S}_{1,d}\delta_k \end{bmatrix}}. \quad (117)$$

Section IV—Clutter Motion: Here, the effect of radar motion is incorporated into the detector 590. In the preceding developments the motion of the clutter due was ignored. For clutter motion that does not cause range migration, the induced clutter motion can be handled a number of documented techniques. This analysis deals with range migrating clutter as well as clutter that may have different mean Doppler in reach range cell.

Subsection (a)—Range Mitigating Clutter: Radars 130 mounted on platforms traveling at high speeds (such as aircraft or satellites) produces range migration effects on the received clutter signal as well as a Doppler offset due the radar motion. To begin with the mean Doppler for ground reflections is:

$$f_d = \frac{2v_r}{\lambda}\cos(\theta_{cone}) = \frac{2v_r}{\lambda}\cos(\theta_{az})\cos(\theta_{el}), \quad (118)$$

where $v_r$ is the radar velocity, $\theta_{cone}$ is the cone angle, $\theta_{az}$ is the azimuth angle and $\theta_{el}$ is the elevation angle. The angles are relative to the radar velocity vector and a specific location on the ground.

To illustrate how range migration compensation can be applied the simple case of the radar traveling north at a constant velocity of $v_r$ at a constant altitude over a flat earth will be used. The technique developed however, is not limited to the simple geometry. Instead, this method is used to simplify the illustrations. The coordinate system used is a follows. The radar height above the ground is $\gamma_{Z_R}$, the radar east/west position is $\gamma_{X_R}$ is a constant zero, and the radar north/south position is $\gamma_{Y_R} = v_r t$ indicating that at time zero (the beginning of the CPI) the radar's position is $\gamma_{X_R} = 0$, $\gamma_{Y_R} = 0$ and $\gamma_{Z_R}$ = constant.

Figure 6A:
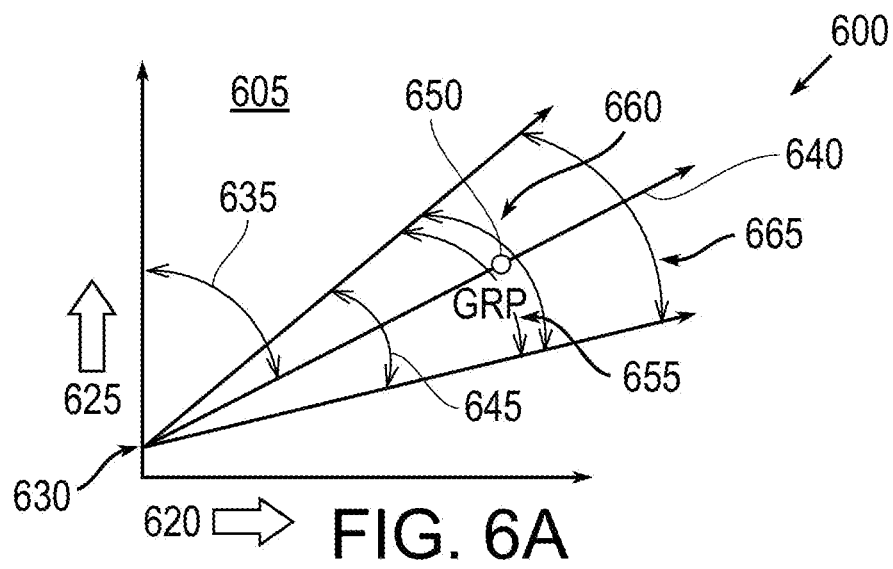
FIGS. 6A, 6B and 6C are plan diagram views of ground reference points for radar.
Figure 6B:
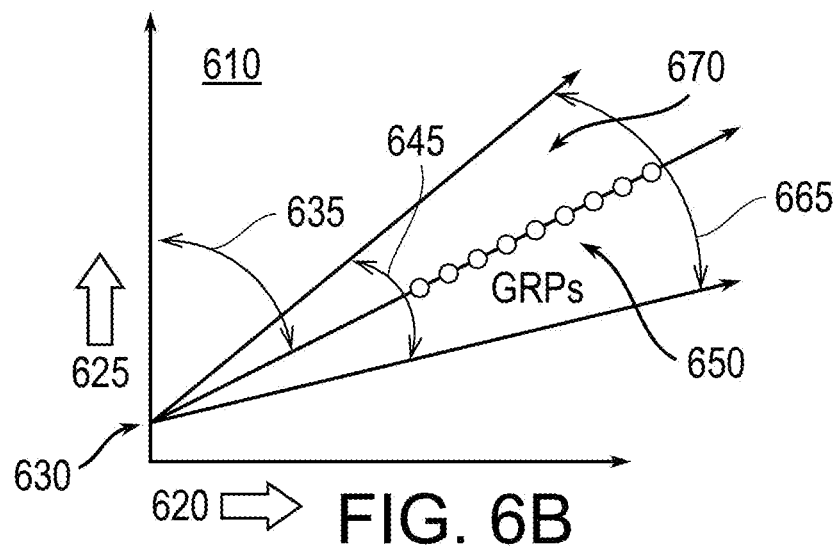
Figure 6C:
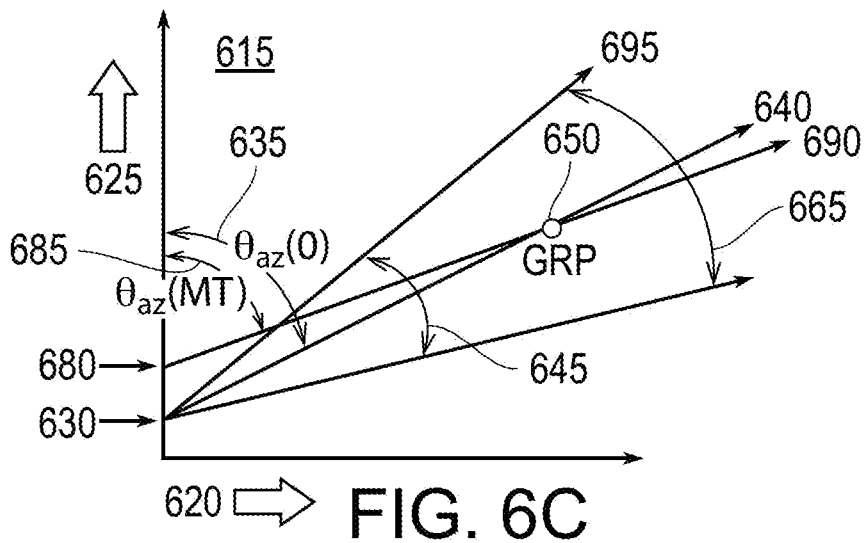

FIGS. 6A, 6B and 6C show plan graphical views 600 of plots 605, 610 and 615 looking downward with directions east 620 as the abscissa and north 625 as the ordinate. The radar 130 travels in the direction of north 625, searching from start position 630 that corresponds to the beginning of CPI at an antenna start pointing angle 635. Plot 605 depicts a beam vector 640 with minimum range arc 645, a Ground Reference Point (GRP) 650, resolution cell 655, clutter region 660 and maximum range arc 665.

From the start position 630, the radar 130 emits a transmit signal along the beam vector 640 across a beam width range denoted by arcs 645 and 665. Plot 610 shows a series of GRPs 650 along the beam vector 640 within an arc region 670 of discernable clutter. Plot 615 shows effect of radar motion from start position 630 at the antenna start pointing angle to end position 680 of CPI at the antenna end pointing angle 685. From the end position 680, the radar 130 emits a transmit signal along a beam vector 690 and along beam width 695. The GRP 650 corresponds to the intersection of the vectors 640 and 690.

The spatial relationship of the radar relative to the stationary ground clutter 120 is illustrated in plan views 600, which hides the altitude and elevation aspect of the problem for simplicity. Graph 605 indicates the minimum and maximum range of the radar 130 as respective arcs 645 and 665. The ranges are determined by the turning on and off the radar receiver 520 on a per-pulse basis. The beam width 695 of the radar antenna 535 (as projected to the ground) is shown as well. These limits define the region of the ground that produces discernable clutter 120 that interferes with target detection. Also indicated in graph 605 is the radar resolution cell 655 projected on the earth's surface. This is the spatial region 660 that produces clutter 120 for receive sample y. At the center of this region is the GRP 650, which provides a reference point to determine mean Doppler frequency eqn. (118) and range migration of the clutter 120.

Consequently, each range resolution cell has an associated GRP 650 as illustrated in graph 610. From each GRP 650 in each cell 655, the mean Doppler and corresponding range change can be calculated. There are P+2(N−1) GRPs 650 corresponding to the P+2(N−1) elements of the vector c previously defined. As the radar 130 moves over the time period of the CPI, the range to the GRP 650 changes as well as its angle, as illustrated in view 615. The range to a given GRP 650 is:

$$R_{GRP}(t) = \sqrt{\gamma_{X_{GRP}}^2 + (\gamma_{Y_{GRP}} - v_r t)^2 + \gamma_{Z_{GRP}}^2} \ . \tag{119}$$

The azimuth angle is:

$$\theta_{az} = \sin^{-1}\left(\frac{\gamma_{X_{GRP}}}{\sqrt{(\gamma_{Y_{GRP}} - v_r t)^2 + \gamma_{X_{GRP}}^2}}\right), \tag{120}$$

and the elevation angle is:

$$\theta_{el} = \sin^{-1}\left(\frac{\gamma_{Z_{GRO}}}{\sqrt{(\gamma_{Y_{GRP}} - v_r t)^2 + \gamma_{X_{GRP}}^2}}\right), \tag{121}$$

where $\gamma_{X_{GRP}}$, $\gamma_{Y_{GRP}}$ and $\gamma_{Z_{GRP}}$ are the coordinates of the GRP 650.

The cone angle of the GRP 650 is:

$$\theta_{cone}(t) = \cos^{-1}(\cos(\theta_{az}(t))\cos(\theta_{el}(t))). \tag{122}$$

The range rate is:

$$\dot{R}_{RGP}^j(t) = \frac{dR_{GRP}(t)}{dt} = \frac{-\gamma_{Y_{GRP}} v_r + v_r^2 t}{\sqrt{\gamma_{X_{GRP}}^2 + (\gamma_{Y_{GRP}} - v_r t)^2 + \gamma_{Z_g}^2}}. \tag{123}$$

Next it is convenient to rewrite range to GRP $R_{GRP}(t)$ as a function of the initial range of the GRP 650 and the initial angles 635. Starting with:

$$R_{GRP}^2(t) = \gamma_{X_{GRP}}^2 + (\gamma_{X_{GRP}} - v_r t)^2 + \gamma_{Z_{GRP}}^2 = R_{GRP}^2(0) + v_r^2 t^2 - 2\gamma_{Y_{GRP}} v_r t, \tag{124}$$

and then substituting north/south position of the GRP 650:

$$\gamma_{Y_{GRP}} = R_{GRP}(0)\cos(\theta_{el})\sin(\theta_{az}), \tag{125}$$

produces the range:

$$R_{GRP}(t) = \sqrt{R_{GRP}^2(0) + v_r^2 t^2 - 2R_{GRP}(0)\cos(\theta_{el})\sin(\theta_{az})v_r t} \ . \tag{126}$$

As stated earlier, the range extent of the clutter 120 is determined by the radar receiver switching time relative to the beginning of the transmit pulse time. If the receiver turn on delay time is (for each receive interval) is $T_{rx\_delay}$ then the range of the closest GRP 650 is $cT_{rx\_delay}/2$. From this the range of each GRP 650 is determined as:

$$R'_{GRP}(0) = \frac{(T_{rx\_delay} + (i-1)T_s)c}{2}, \tag{127}$$

where there are P+2(N−1) GRPs 650 and i∈1, ..., P+(N−1). Because the radar 130 is in motion and the GRPs 650 are stationary, the GRP ranges change over the course of the CPI. The range as a function of time for each GRP 650 can be written as:

$$R'_{GRP}(t) = \sqrt{\frac{c}{2}(T_{rx\_delay} + (i-1)T_x)^2 + v_r^2 t^2 - 2\left(\frac{c}{2}\right)(T_{rx\_delay} + (i-1)T)\cos(\theta_{el})\sin(\theta_{az})} \tag{128}$$

Note that the range rate $\dot{R}_{RGP}^i(t)$ will also vary with i. The amount of change depends on the geometry of the situation. In many cases, the range migration for clutter 120 will be substantially the same for each GRP 650. This is stated mathematically as:

$$\|R_{RGP}^i(MT_i) - R_{GRP}^i(0)\| - \|R_{RGP}^j(MT_i) - R_{GRP}^j(0)\| << \frac{c}{2}T_x, \forall \ i, j. \tag{129}$$

In Subsection (b), the detector 590 is developed under the assumption that clutter range migration is the same for all range resolution cells 655.

Subsection (b)—Uniform Range Migration Detector: The detector 590 that accommodates target range migration and clutter range migration will be developed. This detector 590 is optimum subject to the previously stated assumptions. Further, one can assume that the range migration is the same for each range cell 655, i.e., eqn. (129) is satisfied. Subsection (c) will handle the general case of clutter range migration being different for each range cell 655. Because the range rate for each GRP 650 can be different, Doppler frequency $f_d$ will be different for the clutter 120 that arises from each resolution cell 655.

This is accommodated by reformulating the signal convolution matrix in a similar manner to $\tilde{S}_d(m)$ that was formulated to account for the target Doppler. Thus, the signal convolution matrix for the clutter $\tilde{S}_c(m)$ is defined as:

$$\tilde{S}_c(m) = \begin{bmatrix} 0 & \cdots & s_1 e^{j\Delta_N(m,1)} & \cdots & s_N e^{j\Delta_i(m,N)} \\ & & \ddots & & \\ s_1 e^{j\Delta_{P+2(N-1)}(m,1)} & \cdots & s_N e^{j\Delta_{\mu,2(N-1)(N-1)}(m,N)} & \cdots & 0 \end{bmatrix}, \quad (130)$$

where $\Delta_i(m,n)$ is the phase change of the clutter 120 at the $i^{th}$ GRP 650 from the beginning of the CPI at position 635 to the current pulse n and sample n and is calculated as:

$$\Delta_i(m,n) = \frac{4\pi}{\lambda}(R^i_{GRP}(mT_i + (n-1)T_x) - R^i_{GRP}(0)). \quad (131)$$

Under the assumption that range migration is the same for each range cell 655, there is a single range migration matrix. Therefore, the range migration matrix defined in eqn. (46) with $\Delta T_s$ calculated as:

$$\Delta T_s = \frac{2}{c}(R_{GRP}(mT_i + IT_g) - R_{RGP}(0)). \quad (132)$$

The receive data due to clutter 120 are:

$$Y_c = \begin{bmatrix} \tilde{R}_m(0)\hat{S}_c(0)c(0) \\ \vdots \\ \tilde{R}_m(M-1)\hat{S}_c(M-1)c(M-1) \end{bmatrix}. \quad (133)$$

The clutter correlation matrix is determined as:

$$R_{Y_c} = E\{Y_c Y_c^H\} = E\left\{ \begin{bmatrix} \tilde{R}_m(0)\hat{S}_c(0)c(0) \\ \vdots \\ \tilde{R}_m(M-1)\hat{S}_c(M-1)c(M-1) \end{bmatrix} \begin{bmatrix} \tilde{R}_m(0)\hat{S}_c(0)c(0) \\ \vdots \\ \tilde{R}_m(M-1)\hat{S}_c(M-1)c(M-1) \end{bmatrix}^H \right\},$$

which can be written as:

$$R_{Y_c} = \begin{bmatrix} a_{1,1} & & a_{1,2} \\ & \ddots & \\ a_{2,1} & & a_{2,2} \end{bmatrix}, \quad (135)$$

where $$\begin{aligned} a_{1,1} &= \tilde{R}_m(0)\tilde{S}_c(0)\rho_{1,1}R_c\tilde{S}_c^H(0)\tilde{R}_m'^H(0), \\ a_{1,2} &= \tilde{R}_m(0)\tilde{S}_c(0)\rho_{M,1}R_c\tilde{S}_c^H(M-1)\tilde{R}_m'^H(M-1), \\ a_{2,1} &= \tilde{R}_m(M-1)\tilde{S}_c(M-1)\rho_{M,1}R_c\tilde{S}_c^H(0)\tilde{R}_m'^H(0), \\ a_{2,2} &= \tilde{R}_m(M-1)\tilde{S}_c(M-1)\rho_{M,M}R_c\tilde{S}_c^H(M-1)\tilde{R}_m'^H(M-1). \end{aligned} \quad (136)$$

This is the clutter portion of $R_t$ in eqn. (37). Substituting eqn. (135) into eqn. (37) enables using eqn. (48) as the detector 590 to detect a range migrating target in the presence of range migrating clutter 120.

Subsection (c)—Non-Uniform Range Mitigation Detector: Under some geometries, the range migration of clutter 120 may be significantly different for each range cell 655. Under this condition, the range migration matrix is different for each range cell 655. Under this condition, the range migration matrix is defined as:

$$\tilde{R}_m(m,i)_{(k,i)} = \text{sinc}\left(\frac{((k-1)T_s - \Delta T_s)}{T_s}\right), \quad (137)$$

where i indicates the range cell that the range migration matrix is applicable and $$\Delta T_s = \frac{2}{c}(R^i_{GRP}(mT_i + IT_s) - R^i_{GRP}(0)). \quad (138)$$

Next the column vector c(t;i) is defined as a vector of length of P+2(N−1) whose elements are all zero except the $i^{th}$ element. This element is equal to the $i^{th}$ element of c(t). Thus, $$c(t) = \sum_{i=1}^{P+2(N-1)} c(t;i). \quad (139)$$

Using these definitions, the receive data $Y_c$ due to the clutter 120 for pulse m is:

$$y_c(m) = \sum_{i=1}^{P+2(N-1)} \tilde{R}_m(m;i)\tilde{S}_c(m)c(t,i). \quad (140)$$

where $\tilde{S}_c(m)$ has been previously defined at eqn. (130). The full vector of received data due to clutter 120 is:

$$Y_t = \begin{bmatrix} y_c(0) \\ \vdots \\ y_c(M-1) \end{bmatrix}. \quad (141)$$

Thus the correlation matrix of the clutter 120 in the received data Y:

$$R_{Y_c} = E\{\tilde{Y}_c \tilde{Y}_c^H\} = \begin{bmatrix} E\{y_c(0)y_c^H(0)\} & E\{y_c(0)y_c^H(M-1)\} \\ & \ddots & \\ E\{y_c(M-1)y_c^H(0)\} & E\{y_c(M-1)y_c^H(M-1)\} \end{bmatrix}. \quad (142)$$

Note that:

$$E\{y_c(j)y_c^H(k)\} = E\left\{\left(\sum_{i=1}^{P+2(N-1)} \tilde{R}_m(j,i)\tilde{S}_c(j)c((j)T_i;i)\right) \cdots \left(\sum_{i=1}^{P+2(N-1)} \tilde{R}_m(k,l)\tilde{S}_c(k)c((k)T_i;l)\right)^H\right\}, \quad (143)$$

which can be factored into:

$$E\{y_c(j)y_c^H(k)\} = \sum_{i=1}^{P+2(N-1)} \sum_{j=1}^{P+2(N-1)} \tilde{R}_m(j,i) \quad (144)$$
$$\tilde{S}_c(j) E\{c((j)T_i;i)c^H((k)T_i;l)\}\tilde{S}_c^H(k)\tilde{R}_m^H(k,l).$$

Next one can observe that clutter expectancy:

$$E\{c(jT_i;i)c(kT_i;l)\} = [0], \quad (145)$$

for $i \neq l$. This is due to the previously stated assumption that clutter 120 is a zero mean process and is uncorrelated between range cells 655.

On the other hand, if i=l then expectancy concentrates:

$$E\{(c(jT;i)c^H(jT;i)\} = \rho_{j,k} \begin{bmatrix} 0 & \cdots & 0 \\ & \ddots & \\ & \sigma_i^2 & \\ & & \ddots \\ 0 & \cdots & 0 \end{bmatrix}, \quad (146)$$

where $\rho_{j,k}$ is defined in eqn. (36). This means that eqn. (146) is a matrix of all zeros except for the $i^{th}$ diagonal value, which is equal to the variance of the clutter 120 at the $i^{th}$ GRP 650 multiplied by the $(j,k)^{th}$ time correlation coefficient for that range cell. Next spatial correlation matrix of clutter $R_c(i)$ is defined with all elements equal to zero except for the $(i,i)^{th}$ element which is set to the $(i,i)^{th}$ element of matrix $R_c$, namely clutter variances $\sigma_i^2$. Note the summation matrix:

$$R_c = \sum_{i=1}^{P+2(N-1)} R_c(i). \quad (147)$$

With this eqn. (144) can be written as:

$$E\{y_c(j)y_c^H(j)\} = \sum_{i=1}^{P+2(N-1)} \tilde{R}_m(j,i)\tilde{S}_c(j)\rho_{j,k}R_c(i)\tilde{S}_c^H(k)\tilde{R}_m^H(k,i). \quad (148)$$

Applying eqns. (148) to (142) produces:

$$R_{Y_c} = \begin{bmatrix} a_{1,1} & a_{1,2} \\ & \ddots & \\ a_{2,1} & a_{2,2} \end{bmatrix}, \quad (149)$$

where $$\left.\begin{aligned}
a_{1,1} &= \sum_{i=1}^{P+2(N-1)} \tilde{R}_m(0,i)\tilde{S}_c(0)\rho_{j,k}R_c(i)\tilde{S}_c^H(0)\tilde{R}_m^H(0,i), \\
a_{1,2} &= \sum_{i=1}^{P+2(N-1)} \tilde{R}_m(0,i)\tilde{S}_c(0)\rho_{j,k}R_c(i)\tilde{S}_c^H(M-1)\tilde{R}_m^H(M-1,i), \\
a_{2,1} &= \sum_{i=1}^{P+2(N-1)} \tilde{R}_m(M-1,i)\tilde{S}_c(M-1)\rho_{j,k}R_c(i)\tilde{S}_c^H(0)\tilde{R}_m^H(k,0), \\
a_{2,2} &= \sum_{i=1}^{P+2(N-1)} \tilde{R}_m(M-1,i)\tilde{S}_c(M-1)\rho_{j,k}R_c(i)\tilde{S}_c^H(M-1)\tilde{R}_m^H(M-1,i),
\end{aligned}\right\} \quad (150)$$

This is the clutter portion of Interference $R_I$ in eqn. (37).

Subsection (d)—Estimation of Clutter Mean Amplitude: There are a number of different methods in estimating mean clutter power $\sigma_i^2$. Note that clutter variance $\sigma_i^2$ must be estimated for each range cell i. One method is to use a clutter model such as the Littoral Clutter Model, which has been validated against a number of data sets and shown to generally estimate the clutter to noise to within a standard deviation of 10 dB. Another method is to operate the radar 130 to make clutter measurements online. This generally called clutter mapping.

Subsection (e)—Estimation of Clutter Spectrum: As with amplitude, there are a number of different ways to estimate the clutter spectrum or slow time correlation of clutter ($M_c$ and $\rho_{j,k}$). As with clutter amplitude, the radar 130 can estimate the clutter slow time correlation properties on-line.

A common method to accomplish that is used in weather radar and called pulse pair processing. For radars mounted on fast moving vehicles, the motion of the radar 130 often dominates the clutter spectrum. Under this condition, provides a convenient manner to calculate the Doppler time correlation properties of ground clutter. The motion of the antenna relative to the clutter 120 is illustrated in view 615.

The motion of the antenna beam 640 across the ground modulates the clutter 120 in addition to the Doppler changes based on angle, see eqn. (118). The clutter correlation function $R_g^i(\tau)$ from eqn. (20) can be used. To begin, the transient clutter observed in the receiver 550 for a given range resolution cell 655 centered at the $i^{th}$ GRP 650 can be represented as:

$$c_i(t) = \int \zeta_t(\theta) G_{ant}(\theta - \theta_{P\_az}, \theta_{el} - \theta_{P\_el}) d\theta, \quad (151)$$

where $c_i(t)$ is the clutter voltage present at the receiver for the range cell of interest, t is slow time, $\zeta_t(\theta)$ is the incremental clutter response as a function of azimuth angle $\theta_{az}$, $G_{ant}(\theta,\varphi)$ is the two-way (i.e., transmit and receive) antenna voltage gain as a function of azimuth angle $\theta_{az}$ and elevation angle $\theta_{el}$, $\theta_{P\_az}$ is the azimuth pointing angle of the antenna 535, $\theta_{P\_el}$ is the elevation pointing angle of the antenna 535. The integration in eqn. (151) sums up the back-scatter from the ground according to the antenna gain. The variable of integration is azimuth (changes of gain over elevation is assumed to be negligible). The angles are referenced at the beginning of the CPI.

The clutter voltage response for some time $\tau$ after the beginning of the CPI is:

$$c_i(t+\tau) \int \zeta_{t+\tau}(\theta) G_{ant}(\theta - \theta_{P\_az} - \Delta\theta_{az}(\tau), \theta_{el} - \theta_{P\_el}) d\theta, \quad (152)$$

where random variable:

$$\zeta_{t+\tau}(\theta) = \zeta_t(\theta) \exp(j2\pi\tau(f_d(\theta - \Delta\theta_{az}(\tau), \theta_{P\_el}) - f_d(\theta_{P\_az}, \theta_{P\_el}))), \quad (153)$$

and $\Delta\theta_{az}(\tau)$ is the apparent azimuth change of the GRP 650 over the course of the CPI as illustrated in view 615 computed as:

$$\Delta\theta_{az}(\tau) = \theta_{az}(\tau) - \theta_{az}(0), \quad (154)$$

where $\theta_{az}(r)$ is defined in eqn. (120) and the Doppler frequency $f_d$ is defined in eqn. (118). The reason that the term $f_d(\theta_{P\_az}, \theta_{P\_el})$ is subtracted in eqn. (153) is that the mean Doppler is accounted for in eqn. (131) in the signal convolution matrix $\tilde{S}_c$. Thus, it must be removed in eqn. (153). The time correlation of the clutter for the $i^{th}$ resolution cell associated with the $i^{th}$ GRP 650 is:

$$R_g^i(\tau) = E\{c_i(t)c_i^*(t+\tau)\}. \quad (155)$$

This can be written as correlation:

$$R_{gi}(\tau) = E\left\{\int\int \zeta_t(\alpha)\zeta_{t+\tau}^*(\beta) G_{ant}(\alpha - \theta_{P\_az}, \theta_{et} - \theta_{P\_et})\ldots \right.$$
$$\left. G_{ant}^*(\beta - \theta_{P\_az} - \Delta\theta_{az}(\tau), \theta_{et} - \theta_{P\_et}) d\alpha d\beta\right\}, \quad (156)$$

where $\alpha$ and $\beta$ are dummy variables of integration.

The order of integration and expectation can be changed to give:

$$R_{gi}(\tau) = \int\int E\{\zeta_t(\alpha)\zeta_{t+\tau}^*(\beta)\} G_{ant}(\alpha - \theta_{P\_az}, \theta_{et} - \theta_{P\_et})\ldots$$
$$G_{ant}^*(\beta - \theta_{P\_az} - \Delta\theta_{az}(\tau), \theta_{et} - \theta_{P\_et}) d\alpha d\beta. \quad (157)$$

Next the expectation can be rewritten as:

$$E\{\zeta_t(\alpha)\zeta_{t+\tau}^*(\beta)\} = E\{\zeta_i(\alpha)\zeta_t^*(\beta)\} \cdot$$
$$\exp(j\pi\tau(f_d(\beta - \Delta\theta_{az}(\tau), \theta_{P\_az}, \theta_{P\_et}) - f_d(\theta_{P\_az}, \theta_{P\_et}))). \quad (158)$$

The following assumptions used are applied here, namely:

$$E\{\zeta_i(\alpha)\} = 0, \forall \alpha, \quad (159)$$

and $$E\{\zeta_i(\alpha)\zeta_t^*(\beta)\} = \begin{cases} 1, & \alpha = \beta \\ 0, & \alpha \neq \beta \end{cases}. \quad (160)$$

The assumption in eqn. (159) is arrived at by assuming the phase angle of the clutter voltage is uniformly distributed zero to $2\pi$ for every location. There are two assumptions in eqn. (160). First the power is unity at all locations. (This is done for convenience because the clutter power is captured in random variables $\sigma_i$'s.) The second result comes from the assumption that the clutter voltage phase is independent from angle to angle. Applying eqns. (158), (159) and (152) through (157) produces the following for the time correlation function:

$$R_g^i = \int G_{ant}(\theta - \theta_{P\_az}, \theta_{et} - \theta_{P\_et}) G_{ant}^*(\theta - \theta_{P\_az} - \quad (161)$$
$$\Delta\theta_{az}(\tau), \theta_{et} - \theta_{P\_et}) \cdot \exp(-j2\pi\tau(f_d(\theta - \Delta\theta_{az}(\tau), \theta_{P\_et}) -$$
$$f_d(\theta_{P\_az}, \theta_{P\_et})))d\theta.$$

Section V—Summary and Results: This study set out to develop signal processing that could detect range migrating targets in the presence of clutter. This has been an open problem. Consequently, eqn. (48) is the signal processor that was derived for this problem. In support of this effort a very general target motion model was developed. (There was no requirement for constant velocity or constant acceleration of the target 510.) The signal processor was synthesized by deriving an optimum detector 590 that jointly processes fast time and slow time data. This optimum detector solves the problem of maximizing the probability of detection of a target subject to range and pulse distortion in the presence of clutter 120.

In order simplify this development, the optimum detector 590 (jointly processing fast time and slow time data) was first developed for non-range migrating targets. This was summarized in eqn. (34). This detector 590 is a whitening matched filter, and as such it maximizes the SIR. This detector 590 also maximizes the probability of target detection for a given probability of false alarm (i.e., being a Neyman-Pearson test). Based on the framework developed, the detector 590 for the range migrating targets was derived by modifying the target model to include range migration and pulse distortion. Thus, the signal processor that detects range migrating, pulse distorting targets is also a whitening matched filter eqn. (48). Because this signal processor is a linear processor, direct performance comparisons with other linear processors can be made by comparing the output SIR for each processor. The standard linear processor for radar is the Correlator+MTD. This processor can be shown to be optimum in AWGN. It is convenient to implement as it is often implemented with Fast Fourier Transforms (FFT).

Figure 7:
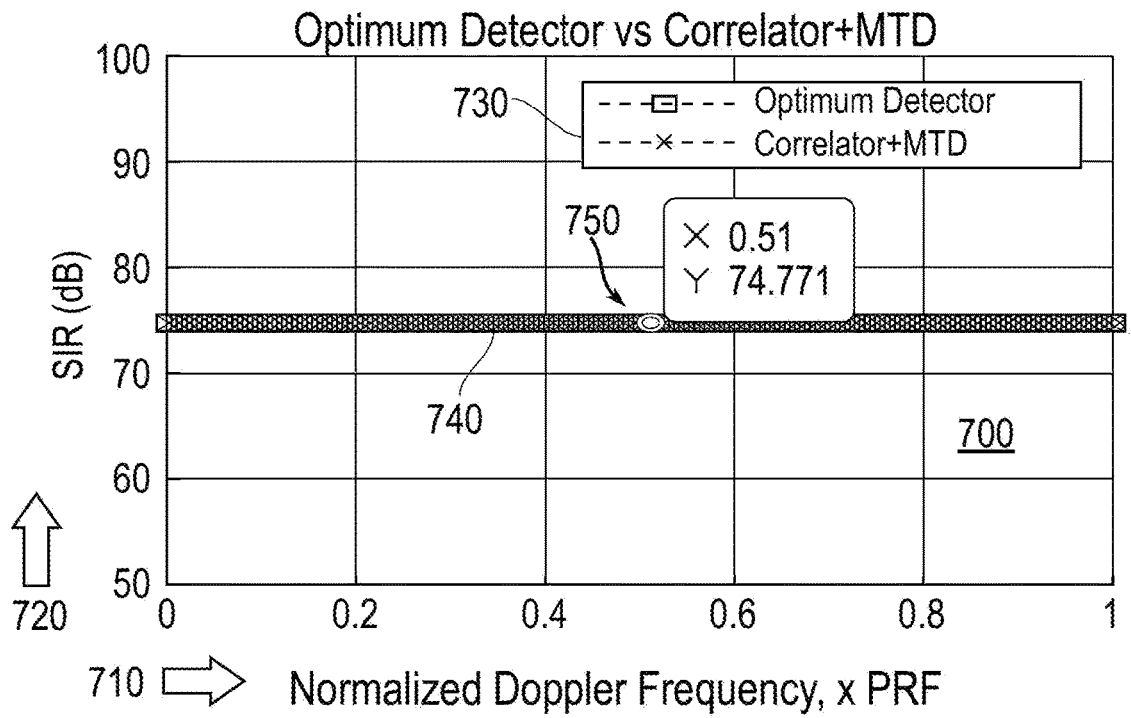
FIG. 7 is a graphical view comparing an optimum detector against Correlator+MTD for normalized Doppler frequency.

To demonstrate this comparison, FIG. 7 provides a graphical view 700 that plots optimum detector versus Correlator+MTD. Normalized Doppler frequency 710 (in multiples of PRF) denotes the abscissa, while SIR 720 (in decibels) denotes the ordinate for a target 510 in AWGN only (i.e., no clutter). A legend 730 identifies the optimum detector (denoted by open square symbols a) and correlator+MTD (denoted by diagonal cross symbols x). These are plotted together along the overlapping lines 740 with a point 750 corresponding to Doppler of 0.51 PRF and SIR of 74.771 dB. View 700 plots the SIR versus ambiguous Doppler frequency for the optimum detector 590 and the Correlator+MTD for a target 510 in AWGN only (i.e., no clutter). In view 700, one can observe that the SIR for both detectors are the same by lines 740. This is because the optimum detector reverts to the Correlator+MTD when there is no clutter. The data input to the detector are complex data sampled at 80 MHz to satisfy the Nyquist sampling theorem. The waveform consists of thirty samples duration (N=30) with ten pulses (M=10).

Figure 8:
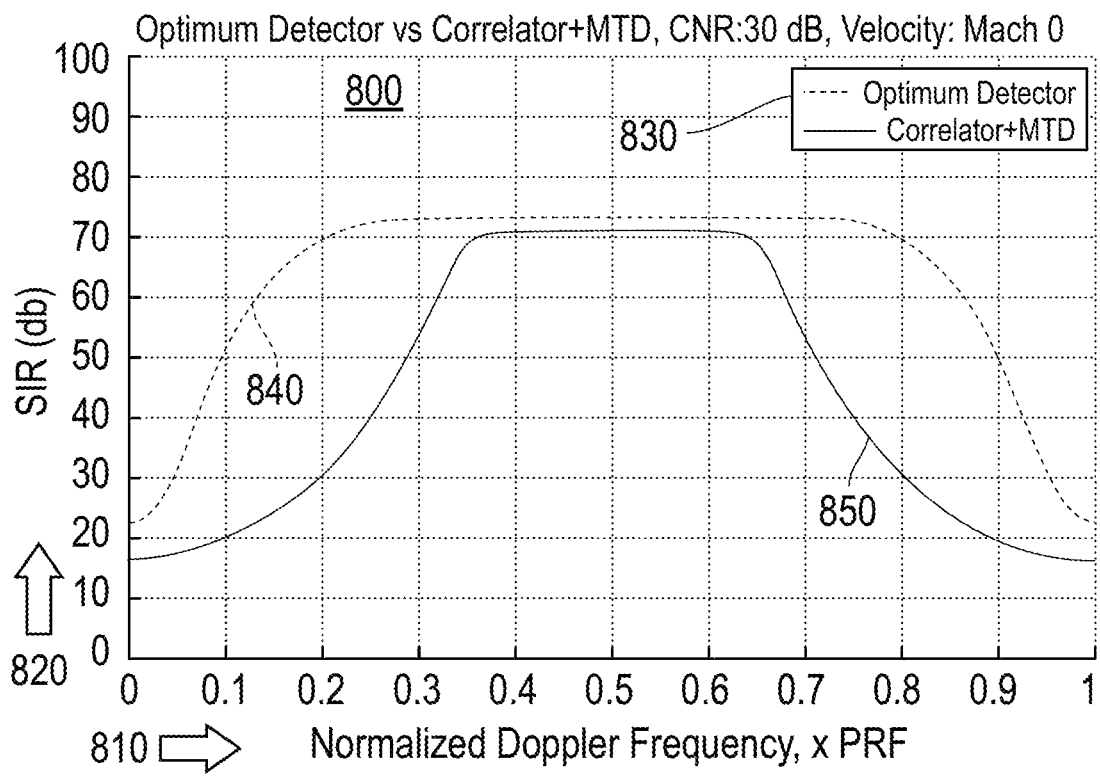
FIG. 8 is a graphical view of comparing the optimum detector for a slow target.
Figure 9:
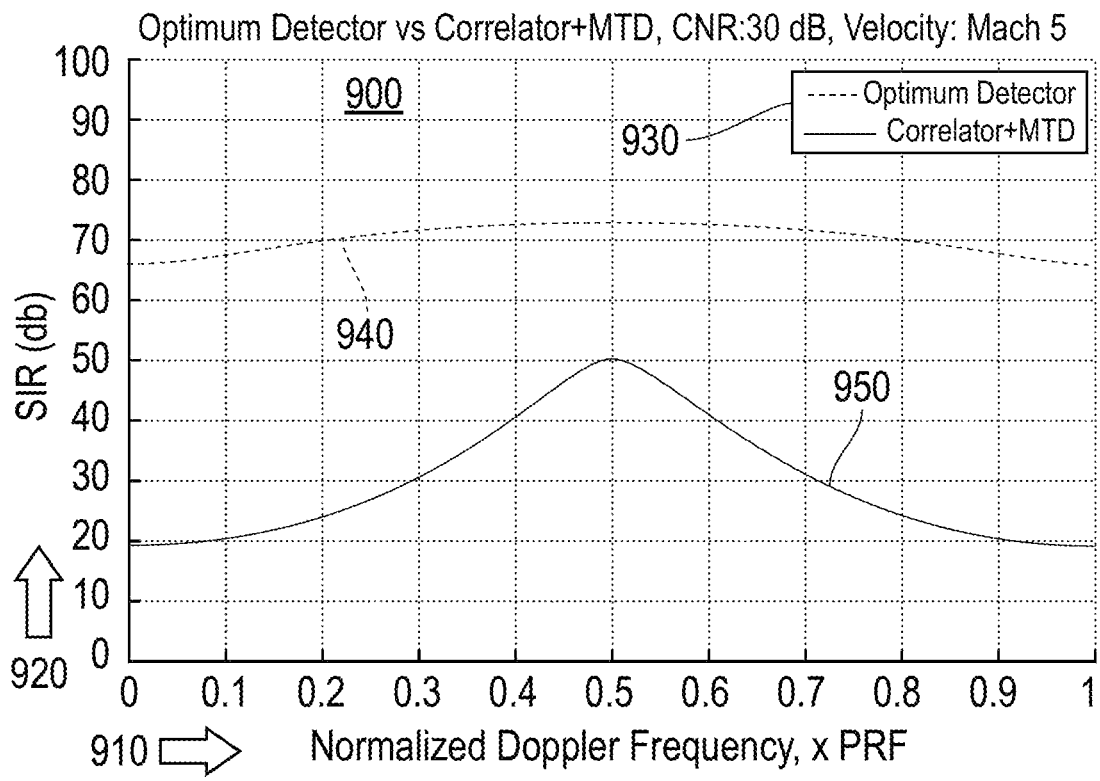
FIG. 9 is a graphical view of comparing the optimum detector for a fast target.

FIG. 8 shows a graphical view 800 of a plot for optimum detector versus Correlator+MTD for a slow moving target 110 and thus no range mitigation. Normalized Doppler frequency 810 (multiples of PRF) denotes the abscissa, while SIR 820 (in decibels) denotes the ordinate, similar to view 700. A legend 830 identifies lines for the optimum detector 840 and the Correlator+MTD 850. By contrast, FIG. 9 shows a graphical view 900 of a plot for optimum detector versus correation+MTD for a Mach 5 target 310, 410 with significant range migration. Normalized Doppler frequency 910 (multiples of PRF) denotes the abscissa, while SIR 920 (in decibels) denotes the ordinate, similar to view 700. A legend 930 identifies lines for the optimum detector 940 and the correlator+MTD 950. The optimum detector profiles 840 and 940 exhibit similar levels at ~72 dB between 0.3 PRF and 0.7 PRF, while the Correlator+MTD profiles 850 and 950 reveal significant contrast. For the slow moving target 110, the correlator profile 850 remains level at ~70 dB from 0.35 PRF to 0.65 PRF, while at Mach 5, the correlator profile 950 exhibits a narrow peak at 50 dB at 0.5 PRF.

For the case of a slow moving target 110 in clutter, view 800 plots the SIR versus ambiguous Doppler frequency for the optimum detector and the Correlator+MTD for a target not subject to range migration. The detector 590 for this target as presented in eqn. (34). For slow moving targets (i.e., negligible range migration) there is small gain in performance (~2 dB) in the range of 0.35 PRF to 0.65 PRF normalized Doppler. The performance of the optimum detector, closer to zero Doppler is due to the fact that it has perfect knowledge of the clutter spectrum as opposed to the Correlator+MTD. Note that this implementation of the Correlator+MTD in view 800 uses Blackman weighting. The performance gain, of the optimum detector over Correlator+MTD near the center of the Doppler passband, is due to the loss of the Blackman weighting and the gain of the optimum detector over the correlator.

FIG. 9 illustrates a graphical view 900 for the impact of range migration in the presence of clutter on the optimum detector developed here and on the Correlator+MTD. As can be seen in view 900, the Correlator+MTD suffers a substantial loss in the presence of clutter. On the other hand the optimum detector keeps most of its performance for ambiguous Doppler of PRF/2 while gaining substantial performance for target Dopplers dose to the clutter Doppler. The performance gain at target Doppler close to the clutter Doppler is due to the detector focusing the target 510 while rejecting the clutter 120. The optimum detector 590 is able to achieve its performance because it jointly processes fast time and slow time data. For an optimum detector 590, fast time and slow time could not be processed separately, but needed to be processed concurrently.

The present disclosure expands the optimum detector to include range migration of the target 510 and the clutter 120. In order to apply the whitening matched filter in eqns. (34) and (48), the assumption had to be made that the clutter power and time correlation was known for each range resolution cell 655. Advances in clutter modeling enable the clutter parameters to be estimated. In order to evaluate the degradation of the optimum detector 590 in the presence of estimation errors, performance equations were derived to calculate the output SIR under the condition of errors in clutter parameters, e.g., eqn. (104), which enables one to calculate the SIR when clutter parameters have been incorrectly determined. By taking the ratio of eqns. (93) and (85) or else eqns. (100) and (104), one can calculate the loss induced by clutter parameter estimation errors. First to compare this detection strategy, one should consider the case of a non-range migrating target 110. In this case, view 800 shows that the optimum detector has nearly a 2 dB advantage over the Correlator+MTD. This occurs due to the fact that practical implementations of the Correlator+MTD often use weighting to control Doppler side-lobe response and the fact that it is not the optimum detector in clutter 120. Both of these features cause the Correlator+MTD to suffer a loss compared to the optimum detector 590.

In order to establish a meaningful assessment of the performance of the optimum detector with clutter parameter estimation errors, the following situation was modeled. First, the actual clutter-to-noise ratio for every range sample was specified as 30 dB. Next, the error in estimating the clutter-to-noise is modeled as a normally distributed error with a standard deviation 10 dB. That is, the error in decibels is normally distributed with a standard deviation of 10 dB and zero mean. This means the linear values of clutter variance $\sigma_i^2$, have a log normal error added to it for every range sample. Similarly, the Doppler spectrum is specified to conform to a text book model of sea clutter, namely, the spectrum is a Gaussian shape with the sigma determined by the sea state. Further, it is modeled that the sea state is estimated with a Gaussian error. This Gaussian error has a standard deviation of a half sea state. Thus, every element of clutter correlation $p_{j,k}$ is impacted by the sea state estimation error.

Figure 10:
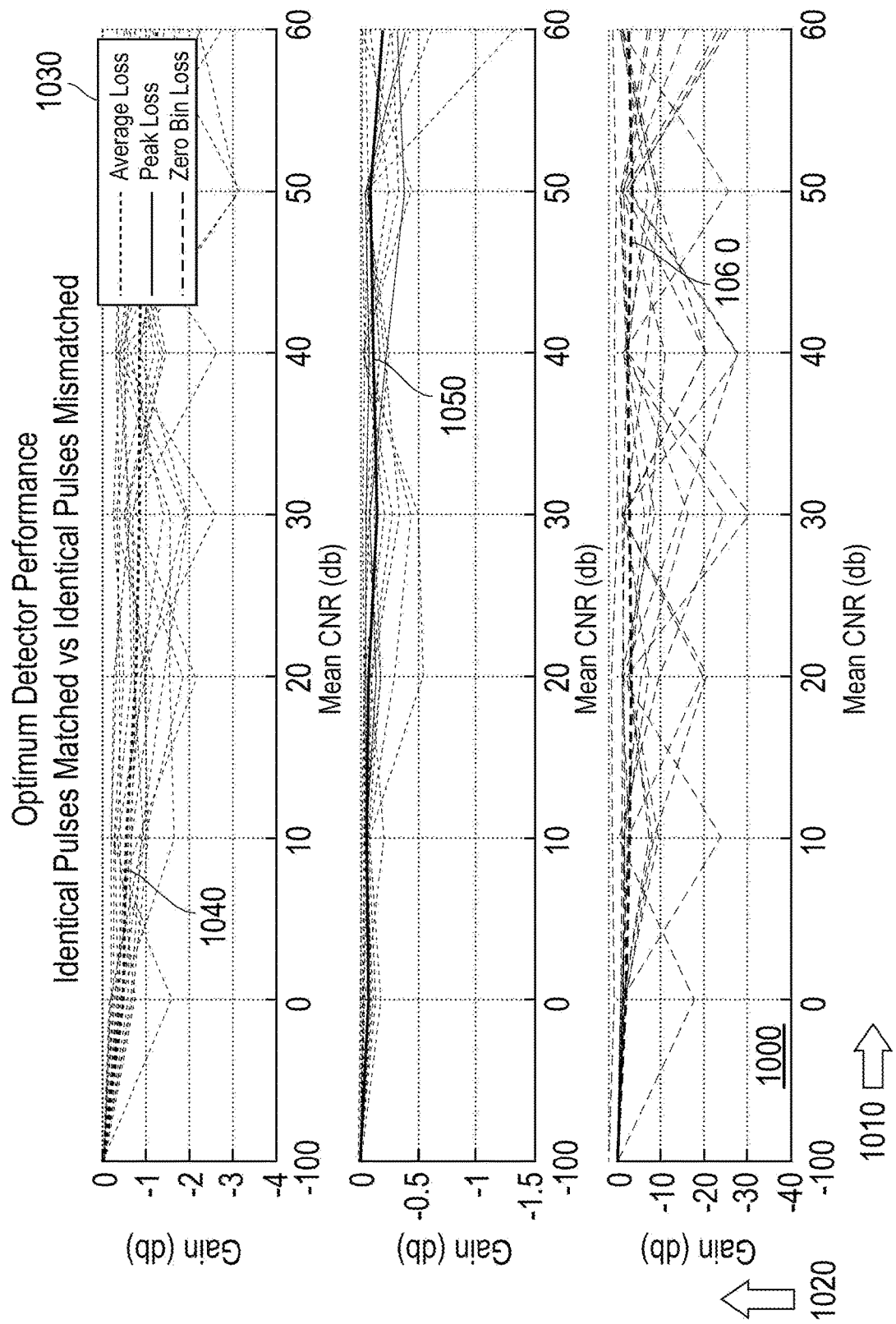
FIG. 10 is a graphical view of optimum detector performance with sea state for a slow target and identical pulses.

FIG. 10 shows a graphical view 1000 of optimum detector performance of identical pulses for three distinguished losses for a non-range mitigating target 110 and with sea state of unity. The comparison is between Matched and Mismatched pulses. Clutter-to-noise ratio (CNR) 1010 (decibels) denotes the abscissa, while gain 1020 (decibels) denotes the ordinate. A legend 1030 identifies mean loss value lines over ten trials for average loss 1040, peak loss 1050 and zero bin loss 1060. Thus view 1000 quantifies the losses 1040, 1050 and 1060 incurred by optimum detector for a non-range migrating target when there are clutter parameter errors and plots the results of ten trails for each value of sea state. The average gain 1040 represents the loss averaged over the whole ambiguous Doppler space. The peak gain 1050 represents the loss for targets whose ambiguous Doppler is at the center of the Doppler pass band. The zero bin gain 1060 is for targets whose ambiguous Doppler is zero. As can be seen, the loss for all the gains 1040, 1050 and 1060, for all CNRs is 2 dB or less. The conclusion here, under reasonable assumptions of clutter parameter estimation error, that detection performance will be on par with a Correlator+MTD. This assertion is justified because the optimum detector can have a roughly 2 dB advantage over a practical implementation of the Correlator+MTD as in view 800.

Figure 11:
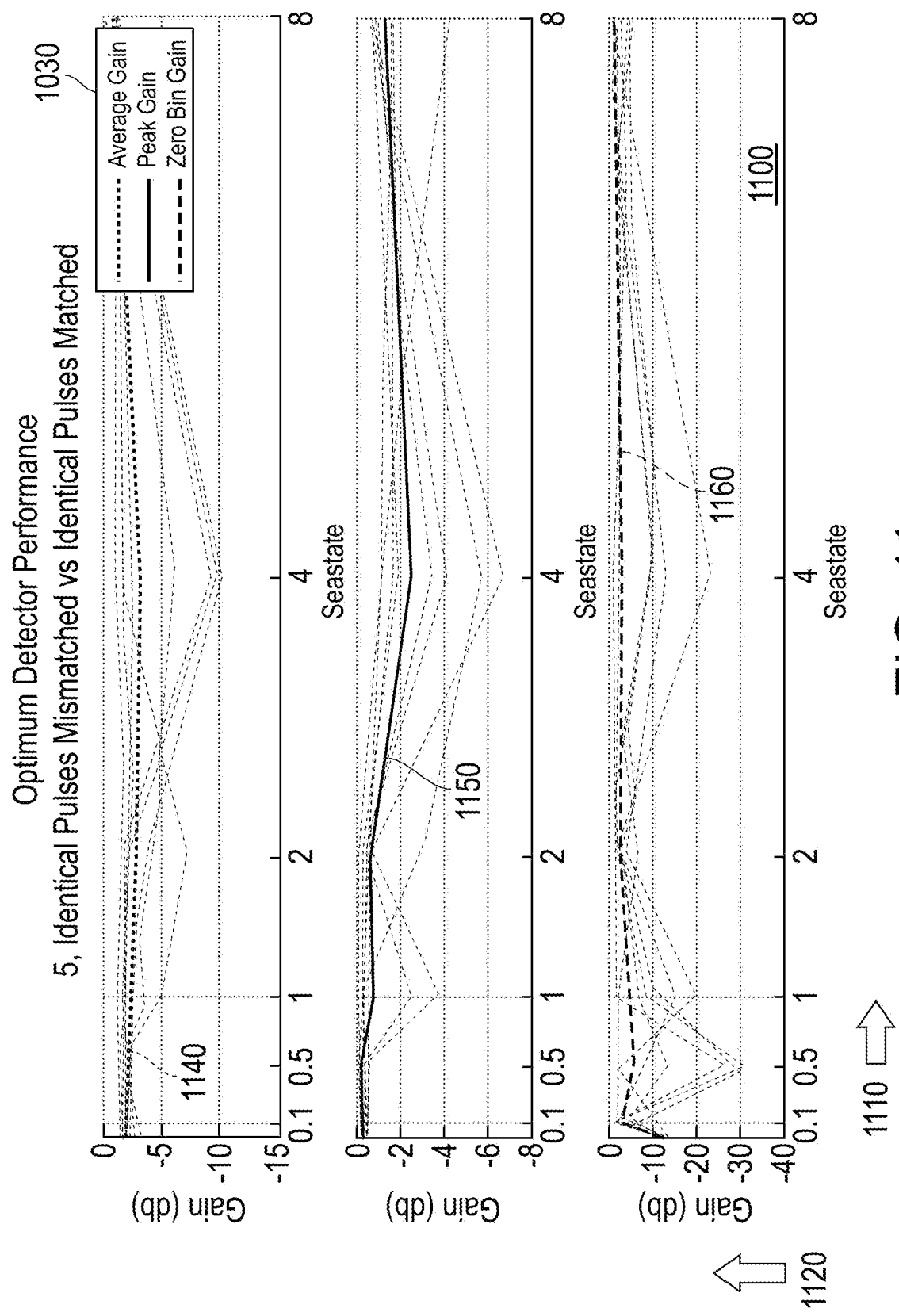
FIG. 11 is a graphical view of optimum detector performance with noise for a slow target and identical pulses.

FIG. 11 shows a graphical view 1100 of optimum detector performance of identical pulses for three distinguished losses for a non-range mitigating target 110 and CNR of 30 dB. The comparison is between Matched detectors that have the correct clutter parameters and Mismatched detectors that have estimate of clutter parameters with errors. Sea state 1110 (logarithmic scale) denotes the abscissa, while gain 1120 (decibels) denotes the ordinate. A legend 1130 identifies mean loss value lines over ten trials for average loss 1140, peak loss 1150 and zero bin loss 1160. Thus view 1100 quantifies the losses 1140, 1150 and 1160 incurred by optimum detector for a non-range migrating target when there are clutter parameter errors. To demonstrate that the optimum detector is robust to clutter estimation errors for different clutter amplitudes, view 1100 plots detector loss versus clutter to noise level with the loss of the optimum detector with clutter parameter errors as a function of the true clutter to noise ratio. For this case the actual sea state is fixed to unity with a half sea state standard deviation error. As can be seen in view 1100, the mean loss over the trials is less than 2 dB.

Figure 12:
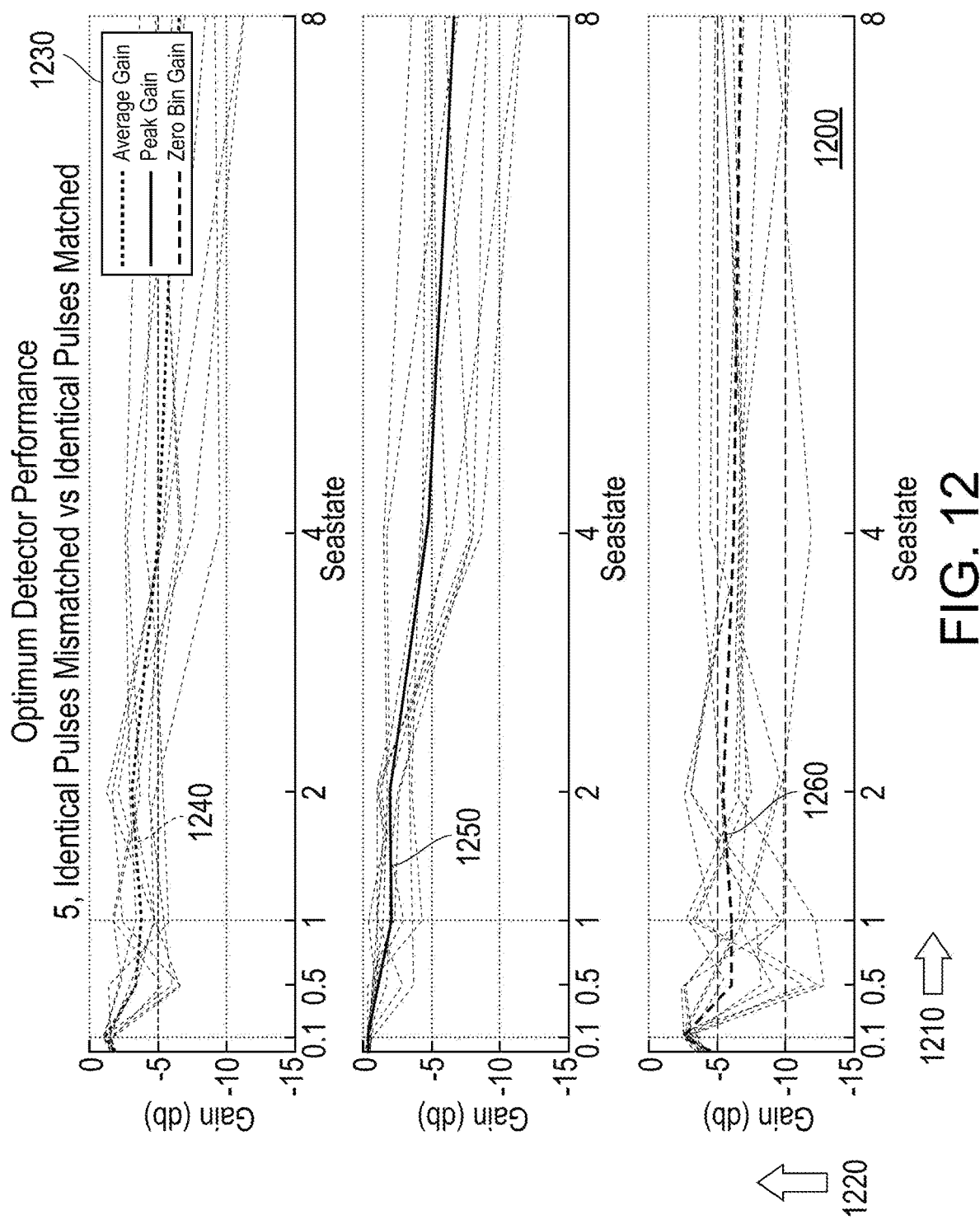
FIG. 12 is a graphical view of optimum detector performance with sea state for a fast target and identical pulses.

FIG. 12 shows a graphical view 1200 of optimum detector performance of identical pulses for three distinguished losses for a Mach 5 target and with 30 dB CNR. Sea state 1210 (logarithmic scale) denotes the abscissa, while gain 1220 (decibels) denotes the ordinate. A legend 1230 identifies mean loss value lines over ten trials for average loss 1240, peak loss 1250 and zero bin loss 1260. The performance of the optimum detector for range migrating, pulse distortion targets under clutter parameter estimation errors is shown in view 1200 with the loss due to estimation error is plotted versus sea state for a nominal target range rate of Mach 5. The true CNR is 30 dB, with 10 dB standard deviation estimation error. Here, although the losses are somewhat larger than for a slow target 110 in view 1000, they are still very small compared to the gain in performance of the optimum detector compared to the Correlator+MTD as shown in view 900.

Figure 13:
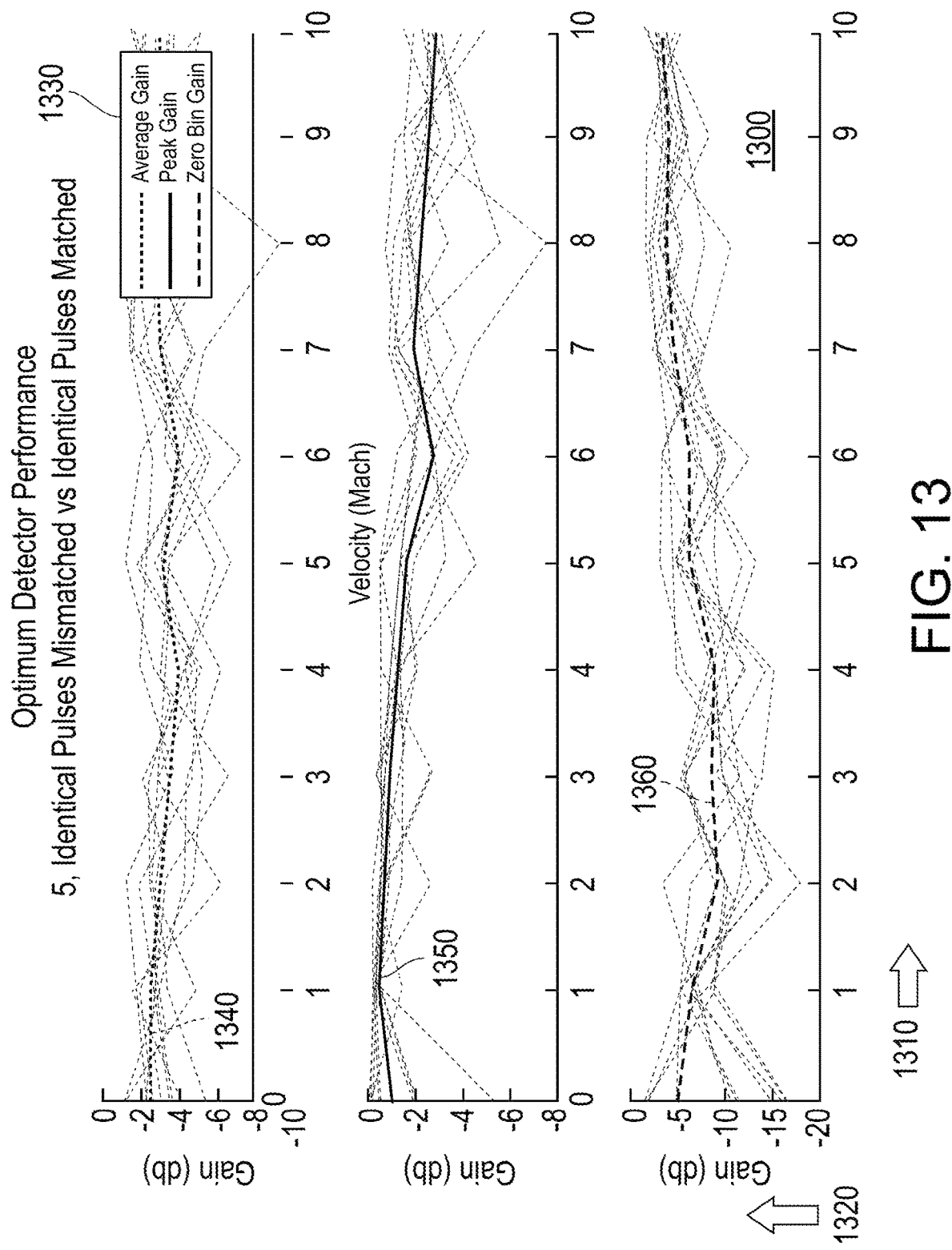
FIG. 13 is a graphical view of optimum detector performance with noise for a fast target and identical pulses.

FIG. 13 shows a graphical view 1300 of optimum detector performance of identical pulses for three distinguished losses for a 30 dB CNR and a sea state of unity. Target range rate 1310 (Mach) denotes the abscissa, while gain 1320 (decibels) denotes the ordinate. A legend 1330 identifies mean loss value lines over ten trials for average loss 1340, peak loss 1350 and zero bin loss 1360, plotting the loss due to clutter parameter error versus nominal target range rate. For this case, the actual sea state is fixed to unity with a half sea state standard deviation error. In view 1300, one can observe that there can be 5 dB or greater loss. However, this is balanced against the substantial gain over the optimum detector compared to the Correlator+MTD as shown in view 900. The conclusion again is that this signal processing approach is robust to errors in clutter parameter estimation.

Signal processing to address range migration targets can also detect targets in clutter when the transmitted signal changes pulse-to-pulse. Other approaches to enable the radar to change signals impose constraints on the transmitted signal. They require the range time side-lobes to be similar to limit the side-lobe clutter modulation that is not cancelled by the radar's Doppler processor. The signal processing developed here enables changing any waveform modulation from pulse-to-pulse. The detector 590 for this situation was described by eqns. (110) and (111).

Figure 14:
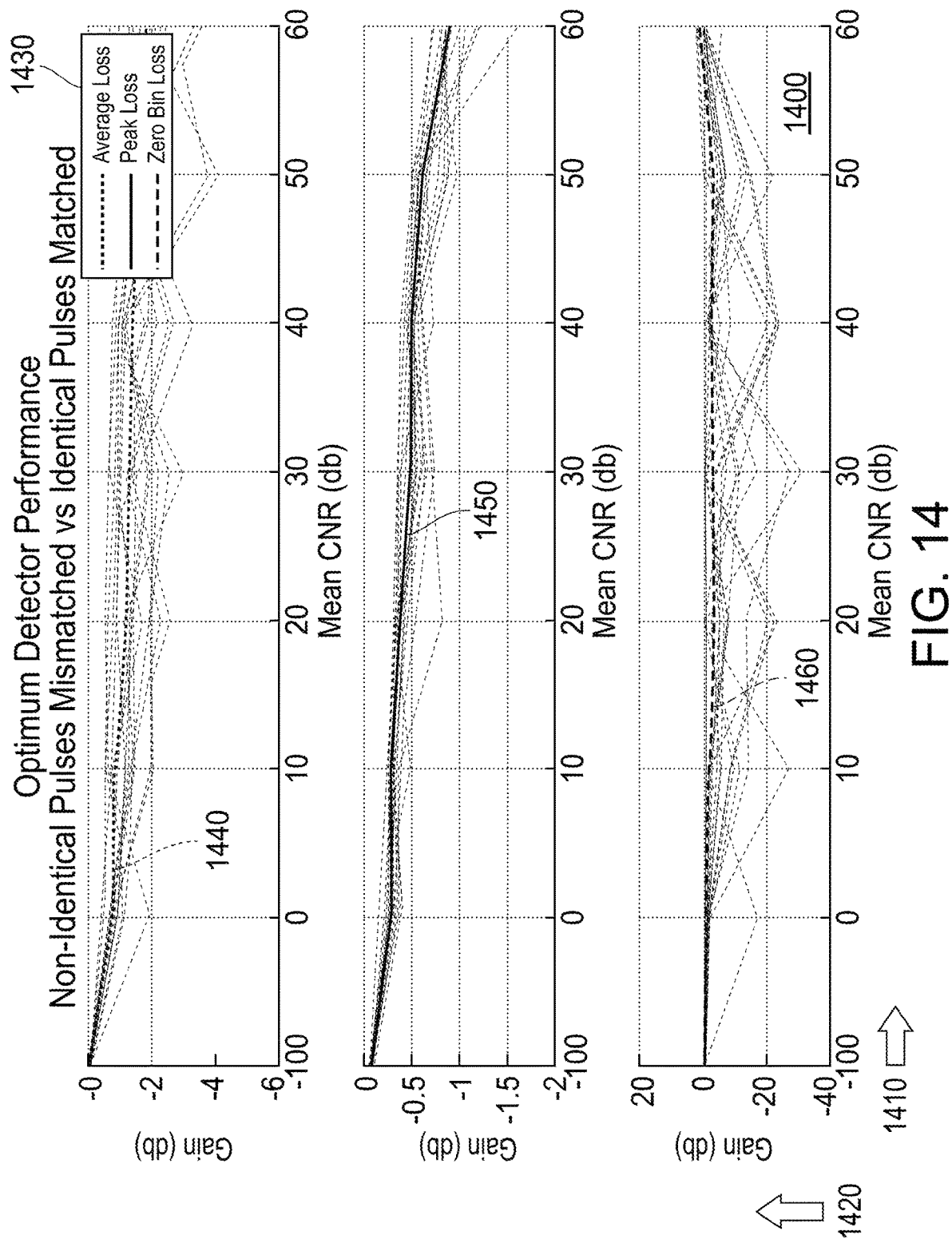
FIG. 14 is a graphical view of optimum detector performance with noise for non-identical versus identical pulses.

FIG. 14 shows a graphical view 1400 of optimum detector performance of mismatched non-identical pulses versus matched identical pulses for three distinguished losses for a slow speed target and with sea state of unity. Mean CNR 1410 (decibels) denotes the abscissa, while gain 1420 (decibels) denotes the ordinate. A legend 1430 identifies mean loss value lines over ten trials for average loss 1440, peak loss 1450 and zero bin loss 1480, for the performance of the non-identical pulse detector in the presence of clutter parameter errors. For this case, the actual sea state is fixed to unity with a half sea state standard deviation error. In view 1400, the loss is less than 2 dB. This loss is against an optimum detector with perfect knowledge of the clutter parameters using identical pulses. View 1400 provides a comparison of mismatched detector using non-identical pulses versus matched detector using identical pulses as a function of mean clutter to noise ratio, slow speed target, while constant sea state is unity.

The exemplary detectors 590 developed herein are for situations of range migrating clutter 120. This situation arises when the radar 130 is on an aircraft or spacecraft looking down on the ground. The ground clutter 480 appears to be moving to the radar 130 and may experience range migration. This can be in addition to target range migration and might be different amounts of range migration for the target 410 and the clutter 480 depending on the radar and target velocity vectors. For situations of uniform clutter range migration, the clutter correlation matrix is determined by eqn. (135). Substituting eqn. (135) into eqn. (37) enables using eqn. (48) as the detector 590 to detect a range migrating target 210, 310, 410 in the presence of range migrating clutter 120.

For the case of clutter range migration that varies with range, eqn. (149) was developed to compute the clutter correlation matrix. Substituting eqn. (149) into eqn. (37) enables using eqn. (48) as the detector 590 to detect a range migrating target in the presence of range migrating clutter. Finally, this disclosure addresses calculating the clutter spectrum for radars in motion. For fast moving radars, the clutter spectrum is dominated by the radar motion. This provides a convenient way to calculate the clutter time correlation parameters. The final development in this effort enables integrating this technique to airborne and spaceborne radars.

Figure 15:
FIG. 15 is a tabular view of radar parameters.

FIG. 15 shows a tabular view 1500 of radar parameters. Note that Table 1 in view 1500 lists in separate columns the radar parameters 1510 with values 1520 used in the calculation of view 700 and subsequent graphs in Section V. These include operating frequency, bandwidth, number of pulses, number of chips and PRF. FIGS. 16A, 16B, 16C, 16D, 16E and 16F show tabular views 1600 of symbols and their meaning in separate columns. The first column 1610 identifies symbol characters. The second column 1620 provides corresponding definitions. The third column 1630 provides an information source for these parameters.

FIGS. 17A, 17B and 17C show a flowchart view 1700 of target detection procedures. The process begins with start 1705. The process begins in FIG. 17A with Start 1705 and determines clutter amplitude $R_c$ 1710 either by modeling or online estimation. This continues to determine time correlation matrix $\rho_{j,k}$ 1715 by modeling or online estimation followed by determine receive noise variance $\sigma_n^2$ 1720. The process continues at node A 1725 initiating in FIG. 17B with first decision 1730 on whether the clutter moves. If yes, the process calculates clutter signal convolution matrix $\tilde{S}_c(m)$ 1735 from clutter motion from eqns. (130). This continues to calculate the clutter range migration matrix $\tilde{R}_m(m)$ 1740 from clutter motions by either eqns. (137) or (46). This continues to calculating the interference correlation matrix $R_I$ 1745 by eqns. (135) or (149), either together with eqn. (32). If no, the process calculates the interference correlation matrix 1750 by eqn. (37).

The process continues at node B 1755 initiating in FIG. 17C with calculate motion signal convolution matrix $\tilde{S}_d(m)$ and target return phase change $u_i$ 1760 from target motion model in eqns. (7), (8) and (23). A second decision 1765 queries whether the target is subject to range migration. If yes, the process calculates the range migration matrix $\tilde{R}_m(n)$ 1770 from the target motion in eqns. (7) and (8), and then proceeds to form the target detector 1775 in eqn. (48) based on threshold η. If no, the process forms the target detector 1780 in eqn. (34) based on threshold η. Following operations 1775 or 1780 for detector formation for radar 130, the process terminates 1790.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method for detecting a target amidst clutter by a radar system able to transmit an electromagnetic signal, receive from a radar antenna first and second echoes respectively from said target and said clutter, and process said echoes, said method comprising:
   determining receive signal convolution matrix $\tilde{S}$ for the target;
   determining clutter amplitude by spatial correlation matrix of clutter $R_c$;
   determining time correlation matrix $\rho_{j,k}$;
   determining receive noise variance $\sigma_n^2$;
   querying whether the clutter moves as a motion condition when satisfied;
   calculating interference correlation matrix $R_I$ from said receive signal convolution matrix, said time correlation matrix and said receive noise variance;
   calculating doppler signal convolution matrix $\tilde{S}_d$ and target return phase change $u_i$ from said receive signal convolution matrix phase $\tilde{S}$ for target motion;
   querying whether the target has range migration as a migration condition for pulse m when satisfied; and
   forming a target detector for the radar system based on threshold η, wherein
   for said motion condition further including prior to said calculating interference correlation matrix:
   calculating clutter signal convolution matrix $\tilde{S}_c(m)$ from clutter motion for said pulse m, and
   calculating clutter range migration matrix $\tilde{R}_m(m)$ for said pulse in from said clutter motion, and
   for said migration condition further including prior to said forming said target detector:
   calculating target range migration matrix $\tilde{R}_m(m)$ from said target motion.

2. The method according to claim 1, wherein the clutter is modeled by said spatial and time correlation matrices.

3. The method according to claim 1, wherein forming a detector employs $$\left\| \begin{bmatrix} u_0 \tilde{R}_m(0) \tilde{S}_d(0) h_{t,R(0)} \\ u_1 \tilde{R}_m(1) \tilde{S}_d(1) h_{t,R(0)} \\ \vdots \\ u_{M-1} \tilde{R}_m(M-1) \tilde{S}_d(M-1) h_{t,R(0)} \end{bmatrix}^H R_I^{-1} Y \right\| \begin{matrix} H_1 \\ > \\ < \\ H_0 \end{matrix} \eta$$

for said migration condition and $$\left\| \begin{bmatrix} u_0 \tilde{S}_d(0) h_t \\ \vdots \\ u_{M-1} \tilde{S}_d(M-1) h_t \end{bmatrix}^H R_I^{-1} Y \right\| \begin{matrix} H_1 \\ > \\ < \\ H_0 \end{matrix} \eta$$

where $u_i$ is pulse change for each δ phase, $h_i$ is position and impulse response of the target, Y is a stacked vector, and $H_0$ and $H_1$ are lower and upper threshold values.

4. The method according to claim 1, wherein said doppler signal convolution matrix is determined by:

$$\tilde{S}_d(m) = \begin{bmatrix} 0 & \cdots & s_1 & s_2 e^{j\phi(m,1)} & \cdots & s_N e^{j\phi(m,N-1)} \\ & & & \vdots & & \\ s_1 & s_2 e^{j\phi(m,1)} & \cdots & s_N e^{j\phi(m,N-1)} & \cdots & 0 \end{bmatrix},$$

where $s_1$ are elements of the electromagnetic signal from the radar system.

5. The method according to claim 1, wherein said target return phase change is determined by:

$$u_i = \exp\left( j4\pi \frac{R(iT_i)}{\lambda} \right).$$

where λ is the wavelength and $T_i$ is the pulse repetition interval.

* * * * *